US011868350B2

(12) United States Patent
Krishnappa et al.

(10) Patent No.: US 11,868,350 B2
(45) Date of Patent: Jan. 9, 2024

(54) METHODS, SYSTEMS, AND COMPUTER PROGRAM PRODUCTS FOR ADAPTIVELY PROVISIONING A SEQUENCE IN A CLUSTERED DATABASE ENVIRONMENT

(71) Applicant: Oracle International Corporation, Redwood Shores, CA (US)

(72) Inventors: Chinmayi Krishnappa, San Mateo, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/450,426

(22) Filed: Oct. 8, 2021

(65) Prior Publication Data

US 2023/0111899 A1    Apr. 13, 2023

(51) Int. Cl.
*G06F 16/00*        (2019.01)
*G06F 16/2455*    (2019.01)
(Continued)

(52) U.S. Cl.
CPC .... *G06F 16/24552* (2019.01); *G06F 11/3428* (2013.01); *G06F 16/285* (2019.01)

(58) Field of Classification Search
CPC ............. G06F 12/0897; G06F 12/0862; G06F 2212/60; G06F 3/0604; G06F 3/064; G06F 1/3225; G06F 1/3228; G06F 12/023; G06F 12/0246; G06F 12/0804; G06F 12/0811; G06F 12/0866; G06F 12/0868; G06F 12/0888; G06F 12/0893; G06F 13/00; G06F 13/385; G06F 2212/1044; G06F 2212/2022; G06F 2212/222; G06F 2212/225; G06F 2212/462; G06F 2212/7208; G06F 3/0608; G06F 3/061; G06F 3/0611; G06F 3/0656; G06F 3/0683; G06F 13/28; G06F 13/4022; G06F 13/4221; G06F 16/955; G06F 2201/805; G06F 3/147; G06F 8/427; G06F 8/70; G06F 2209/505; G06F 16/9566;
(Continued)

(56) References Cited

U.S. PATENT DOCUMENTS 7,734,658 B2    6/2010  Parkinson et al.
10,540,711 B1   1/2020  Gau et al.
(Continued)

OTHER PUBLICATIONS

Non-Final Office Action for U.S. Appl. No. 17/450,428 dated Oct. 27, 2022.
(Continued)

*Primary Examiner* — Shyue Jiunn Hwa
(74) *Attorney, Agent, or Firm* — Vista IP Law Group, LLP

(57) ABSTRACT

Described are improved systems, computer program products, and methods for adaptively provisioning an ordered sequence in a clustered database environment. The approach includes identifying a cached list of sequence numbers. A request for one or more sequence numbers in a database environment may be received. A determination may be made to decide whether the request pertains to an ordered sequence. The one or more sequence numbers may be adaptively provisioned to fulfill the request based at least in part upon an independent cache implementation or upon a shared cache implementation.

21 Claims, 18 Drawing Sheets

(51) Int. Cl.
  *G06F 11/34*    (2006.01)
  *G06F 16/28*    (2019.01)
(58) Field of Classification Search
  CPC ............. G06F 16/9574; G06F 11/1464; G06F 9/4493; G06F 9/5033; G06F 9/5077; G06F 9/542; G06F 11/1451; G06F 11/1458; G06F 11/2023; G06F 16/972; G06F 16/986; G06F 3/04817; G06F 3/0483; G06F 3/0485; G06F 40/117; G06F 40/123; G06F 40/143; G06F 40/154; G06F 40/186; G06F 8/65
  See application file for complete search history.

(56) References Cited

U.S. PATENT DOCUMENTS

| | | | |
|---|---|---|---|
| 2005/0050221 | A1 | 3/2005 | Tasman et al. |
| 2011/0029498 | A1 | 2/2011 | Ferguson et al. |
| 2013/0297802 | A1* | 11/2013 | Laribi ............... H04L 47/80 709/226 |
| 2015/0199138 | A1* | 7/2015 | Ramachandran ..... G06F 3/0616 711/103 |
| 2016/0321222 | A1* | 11/2016 | Greenberg .......... G06F 16/9577 |
| 2016/0335299 | A1 | 11/2016 | Vemulapati et al. |
| 2018/0011744 | A1 | 1/2018 | Liguori et al. |
| 2019/0303849 | A1 | 10/2019 | Boggarapu et al. |
| 2019/0370173 | A1 | 12/2019 | Boyer et al. |

OTHER PUBLICATIONS

Goodman, J., "Keep Your Sequences in Order," DBatrain, date found via Internet Archive as Sep. 19, 2015.
Nag, A., et al., "GenCache: Leveraging In-Cache Operators for Efficient Sequence Alignment," Association for Computing Machinery, Copyright 2019.
"Sequence Caching: Oracle vs. PostgreSQL," die Seilerwerks, dated Oct. 2, 2018.
Biradar, B., "Sequence Cache management and Internals—Sql Server 2012," SqlHints.com, dated Aug. 19, 2013.
Richardson, B., "Sequence Objects in SQL Server," SQLShack, dated Mar. 22, 2018.
Kadiyala, S., "Determining appropriate Sequence Cache value," Srivenu Kadiyala's Blog, dated Dec. 9, 2010.
"How To: Alter Oracle sequence cache sizes for specific SDE repository sequences," esri, URL: https://support.esri.com/en/technical-article/000009057, date found via Internet Archive as Nov. 18, 2017.
"Notes About Oracle SQL, PLSQL and Apex," svenweller, URL: https://svenweller.wordpress.com/2019/08/20/some-quick-facts-about-sequence-caches-and-gaps-in-ids/, dated Aug. 20, 2019.
"Sequence cache and RAC," Burleson Consulting, URL: https://www.dba-oracle.com/t_rac_tuning_sequence_cache_parameter.htm, dated Oct. 3, 2015.
"Sequence order parameter and RAC," Burleson Consulting, URL: https://www.dba-oracle.com/t_rac_tuning_sequence_order_parameter.htm, dated Oct. 3, 2015.
Limeback, R., "Order by a specified sequence," TechTarget, URL: https://www.techtarget.com/searchoracle/answer/ORDER-BY-a-specified-sequence, dated Apr. 21, 2006.
"Basic SQL: All about sequences," scenweller, URL: https://svenweller.wordpress.com/2019/01/04/basic-sql-all-about-sequences/, dated Jan. 4, 2019.
Bisso, I., "SQL Order of Operations," LearnSQL.com, URL: https://learnsql.com/blog/sql-order-of-operations/, dated Oct. 8, 2019.
"What Can Go Wrong With Sequence?," dbarepublic, URL: http://www.dbarepublic.com/2016/04/what-can-go-wrong-with-sequence.html, dated Jan. 21, 2021.
Wallace, E., "Realtime Editing of Ordered Sequences," figma.com, URL: https://www.figma.com/blog/realtime-editing-of-ordered-sequences/, dated Mar. 6, 2017.
"Order of events for database objects," Microsoft, URL: https://support.microsoft.com/en-us/office/order-of-events-for-database-objects-e76fbbfe-6180-4a52-8787-ce86553682f9, date found via Internet Archive as Nov. 11, 2020.
Smith, I., "Guide to Using SQL: Sequence Number Generator," Oracle rdb, dated May 15, 2003.
Xing, Z., et al., "A Brief Survey on Sequence Classification," SIGKDD Explorations, vol. 12, Issue 1, dated Nov. 9, 2010.
Astrahan, M., et al., "System R: Relational Approach to Database Management," IBM Research Laboratory, ACM Transactions on Database Systems, vol. 1, No. 2., Jun. 1976, pp. 97-137.
Final Office Action dated Feb. 17, 2023 for U.S. Appl. No. 17/450,428.
Non-Final Office Action dated Sep. 27, 2023 for U.S. Appl. No. 17/450,428.

* cited by examiner

METHODS, SYSTEMS, AND COMPUTER PROGRAM PRODUCTS FOR ADAPTIVELY PROVISIONING A SEQUENCE IN A CLUSTERED DATABASE ENVIRONMENT

CROSS REFERENCE TO RELATED APPLICATION(S)

This disclosure is related to U.S. patent application Ser. No. 17/450,428 entitled "METHODS, SYSTEMS, AND COMPUTER PROGRAM PRODUCTS FOR EFFICIENTLY ACCESSING AN ORDERED SEQUENCE IN A CLUSTERED DATABASE ENVIRONMENT", which is filed concurrently herewith. The content of the aforementioned U.S. patent application is hereby explicitly incorporated by reference for all purposes.

FIELD

This disclosure concerns a method, a computer program product, and a computer system for adaptively provisioning ordered and unordered sequence numbers for application cluster(s) in a database environment.

BACKGROUND

A relational database management system (RDBMS) controls the storage, organization, and retrieval of data stored in relational databases located at one or more database servers. The database server(s) may be interconnected by a network, which may also connect to one or more clients (e.g., workstations, personal computers, or remote computing terminals). Clients may submit SQL statements via the network to perform various tasks in a relational database. There are different types of SQL statements to perform the various tasks in the relational database. For example, clients may manage database objects such as tables, views, etc. using data definition language (DDL) statements (e.g., create schema objects, alter schema objects, drop schema objects, grant and revoke privileges, etc. that result in data dictionary property change(s). As another example, clients may access data stored in the database schema objects (e.g., tables, views, etc.) using SQL query statements (e.g., SELECT SQL statements).

Database sequences are designed to give out a sequential range of values in a performant way. Sequence objects may be used by customers in a variety of ways—to generate automatic primary keys for table columns, for application specific unique identifiers, and to enforce ordering across identifiers, to name a few. Ordered sequences allow ordering without gaps and are useful for applications such as reservation systems. For example, one use case for sequences is to generate automatic primary keys for a table column. An "ordered" sequence enforces a strict ordering on the sequence values (or sequence numbers) returned.

When an ordered sequence is accessed in parallel from several entities (e.g., multiple sessions of an instance), the serialization required for ordering becomes a performance bottleneck. This bottleneck is further exacerbated in a multi-instance environment—the sequence may be advanced from several sessions across multiple instances and synchronization across instances is inherently more expensive.

To use sequencing in a database, the clients of the database systems may need to implement ordering with sequences in a manner where they have to synchronize at a higher level with an application-level lock. For example, some approaches first require clients to use unordered sequence numbers and then introduce a higher-level of synchronization (e.g., application-level synchronization) to enforce ordering among the sequence numbers that are used. These requirements of ordered sequences and synchronization with an application-level lock scales poorly and cause a significant slowdown, even with a fairly large sequence cache size. This poor scalability is one of the reasons that ordered sequences are often poorly supported (e.g., with significant slowdowns) or not supported at all by many databases. Therefore, only some databases provide support for ordered sequences, albeit with the reduced performance on these databases being a known issue.

Therefore, some legacy approaches only support unordered sequences. However, users who would like to obtain ordered sequences for their workloads may then need to use an unordered sequence and then introduce a higher level of synchronization to enforce ordering, usually at the application level. Some approaches may further exhibit significant slowdowns in performance of database systems, especially in a clustered database environment. Some of these approaches address such slowdowns by increasing the sequence cache size so as to reduce the total cost to retrieve sequence numbers from disk. Although these approaches may improve the performance of the database systems, such improvement is often barely satisfactory to users. Moreover, since data and/or metadata for these larger sequence cache sizes are typically maintained in memory for performance reasons, the users of these approaches also run a higher risk of losing greater amounts of productivity if a failure occurs because more results, work product, and/or larger sets of sequence numbers may be lost due to the loss of the node having the larger sequence cache size.

On the other hand, decreasing the sequence cache size will mitigate the risk of lost productivity in the event of a system failure because fewer sequence numbers and hence less work have been processed due to the smaller sequence cache size. Nonetheless, decreasing a sequence cache size requires more frequent access to new sequence numbers from disk and thus further slows down database systems and incur greater system costs.

Therefore, what is needed is a technique or techniques to address at least the aforementioned shortcomings of conventional approaches and also to improve over various conventional approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to some embodiments, described are improved systems, computer program products, and methods for adaptively provisioning sequence values in a database environment, e.g., a clustered database environment. The present embodiments provide a technique or techniques to address at least the aforementioned shortcomings of alternative approaches and also to improve over various alternative approaches. The present disclosure embeds synchronization into the lowest level within the database making it much more performant. The present disclosure employs a mechanism to reduce the contention seen with ordered sequences on a single instance as well as across instances. The mechanism may be completely transparent to the end user and will not require any user intervention.

According to some embodiments, the present disclosure includes identification of a cached list of sequence numbers. A request for one or more sequence numbers in a database environment may be received. A determination may be made to decide whether the request pertains to a sequence. The amount of sequence numbers to provision may be adaptively determined to fulfill the request, e.g., based at least in part upon a previous consumption rate. The adaptive provisioning of the sequence numbers may be employed with respect to an independent cache implementation or a shared cache implementation.

Various embodiments described herein provide an improved approach to adaptively provision ordered and/or unordered sequence numbers in any database environment, particularly in a clustered database environment where multiple entities (e.g., sessions, instances, computing nodes, etc.) respectively request sequence numbers.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g., "120" in the text refers to reference numerals "120a" and/or "120b" in the drawings). The disclosure will be described and explained with additional specificity and detail through the use of the accompanying drawings in which.

DETAILED DESCRIPTION

Figure 1:
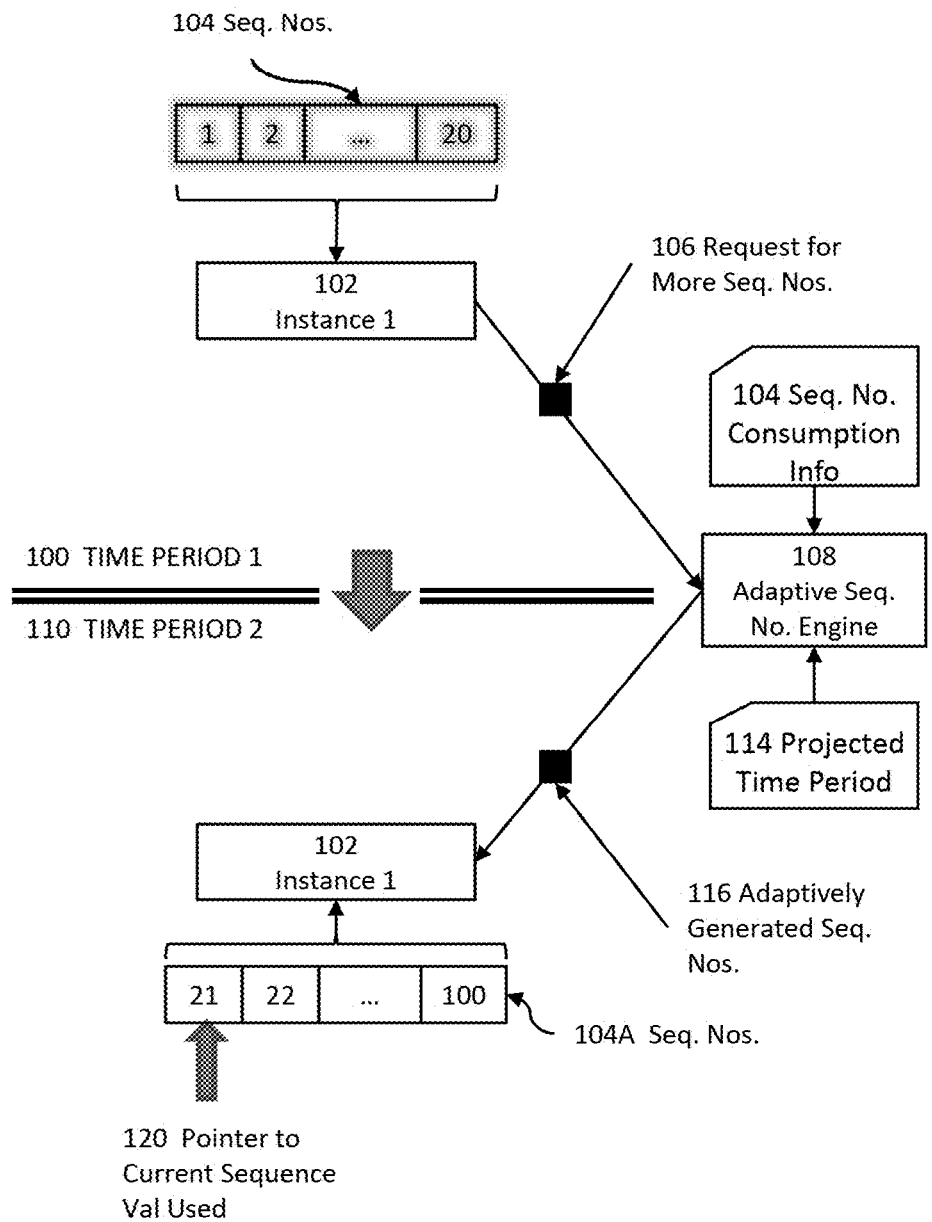
FIG. 1 illustrates a schematic diagram of a system for adaptively provisioning sequence numbers in a clustered database environment.

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Overview

As previously noted, both ordered and unordered sequences have wide applications in databases. Various embodiments described herein provide an improved approach to adaptively ordered and/or unordered sequence numbers in any database environment, particularly in a clustered database environment where multiple entities (e.g., sessions, instances, computing nodes, etc.) respectively request sequence numbers to address at least the aforementioned shortcomings of alternative approaches.

In some of these embodiments where sequence numbers are requested, the number of sequence numbers and/or a size of a data structure (e.g., cache memory) that temporarily stores a list of sequence numbers obtained from, for example a disk, is adaptively determined based at least in part upon one or more factors after the sequence numbers stored in the data structure have been consumed. As used herein, the term 'cache" as applied to sequence numbers corresponds to a logical allocation of a set of sequence numbers, e.g., where the cache stores the list of allocated sequence numbers and/or a logical list comprising a start position and an end position for a given sequence. In these embodiments, the term "cache" or 'cache size" does not necessarily refer as such to a size of a memory structure for holding the sequence (although any suitable medium such as memory may be used to hold sequence number values), but instead refers to the logical representation of the sequence numbers as having a given number of values, e.g., where a larger cache comprises logically more numbers and a smaller cache comprises logically less numbers. In an alternate embodiment, the "cache" term does refer to a physical amount of storage that is set aside for the sequence numbers, where a larger cache indicates that more physical space is set aside in the cache as opposed to a smaller cache of sequence numbers that corresponds to a smaller allocation of memory/ storage.

As previously noted, one or more factors may be used to dynamically determine the number of sequence values to be allocated. These one or more factors may include, for example, the next available sequence number for the database system in which the entity executes, the high-watermark indicative of the currently maximum sequence number deployed (e.g., to a data structure storing sequence numbers for use by a computing entity) in the database system, information concerning how the list of sequence numbers has been consumed (e.g., a consumption rate), or a projected time period for which the next list of sequence numbers is to be determined, or any other suitable factors, or any combinations thereof.

For example, at the time or after an existing list of sequence numbers has been fully consumed, a new list of sequence numbers with the same or different total number of sequence numbers (e.g., by determining a cache of a larger size, a smaller size, or the same size) may be adaptively determined based at least in part upon, for example, how fast the existing list of sequence numbers was previously consumed. In these embodiments, the next list of sequence numbers may be independently determined for one entity from that for another entity. Multiple entities may thus independently (e.g., in parallel) consume and replenish their respective cached sequence numbers without waiting for other entities while achieving an improved or optimized balance between performance and mitigated risk of productivity loss. These embodiments not only provide the aforementioned advantages but are also highly scalable, particularly for a clustered database environment.

As described in more detail below, in some other embodiments where ordered sequence numbers are required or enforced across multiple instances/nodes, multiple nodes/ entities "share" a data structure in that the respective data structures temporarily storing respective lists of sequence numbers may be first populated with the same or overlapping sequence values while the database system in which these multiple entities execute maintains the next available sequence number (e.g., by using a Nextval pointer) and the high-watermark.

In some embodiments, the adaptive sizing of computing entity's cache for sequence numbers is performed based at least in part upon the computing entity's consumption of at least some of the sequence numbers. In some other embodiments, the adaptive sizing of a first computing entity's data structure is based at least in part upon one or more other computing entities' consumption of sequence numbers.

With a new size of the cache determined, this cache may be populated with next available sequence numbers based at least in part upon, for example, the next available sequence numbers, and/or the high-watermark, etc. The computing entity may then start consuming at least one of the newly populated sequence numbers.

When another computing entity (e.g., a second computing entity) requests a sequence number, the data structure for the second computing entity may be updated to include at least the available sequence numbers (e.g., the remaining sequence numbers in the first computing entity's data structure after the first computing entity has consumed at least one of the newly populated sequence numbers). After its cache storing these available sequence numbers is updated, the second computing entity may start consuming at least one of the available sequence numbers in its cache. Each time a computing entity consumed a sequence number, the nextval pointer is moved to the next available sequence number (e.g., by modifying the metadata associated with sequence numbers), and this information may be made available to all the computing entities that request their respective ordered sequence numbers so that the ordering of sequences is enforced in the database environment.

In some embodiments, when the existing sequence numbers stored in a cache for a computing entity are consumed, an adaptive sequence number engine (e.g., 108 in FIG. 1) may be invoked to determine an adaptive size of the cache. The adaptive size of the cache may be determined based at least in part upon how quickly the computing entity alone consumed the sequence numbers stored in the cache in some embodiments or on how quickly the computing entity and one or more other computing entities consumed the sequence numbers that were populated into their respectively caches and were jointly consumed by the computing entity and the one or more other computing entities or singularly consumed by any one of the one or more other computing entities. More details about various embodiments of the present disclosure are described below in the Detailed Description section.

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments described herein provide an improved approach to adaptively provision sequence numbers in any database environment, particularly in a clustered database environment where multiple entities (e.g., sessions, instances, computing nodes, etc.) respectively request sequence numbers to address at least the aforementioned shortcomings of conventional approaches.

FIG. 1 illustrates a schematic diagram of a system for adaptively provisioning sequence numbers in a clustered database environment, according to some embodiments of the present disclosure. More specifically, FIG. 1 illustrates that during time period 1 (100), a computing entity 102 (e.g., an instance) in the database environment issues a request 106 for one or more sequence numbers where all of the sequence numbers ("1"-"20") temporarily stored in the data structure 104 have been consumed.

In response to the request for one or more sequence numbers issued by the computing entity 102, an adaptive sequence number engine 108 may determine an adaptive size of the cache/data structure 104 of the next list of sequence numbers for the computing entity 102. For example, the adaptive sequence number engine 108 may determine how quickly the current sequence numbers in the data structure 104 were consumed. For example, the adaptive sequence number engine 108 may determine that the sequence number consumption rate is 20 sequence numbers for the time period 1 (100) (which may be referred to as a consumption time period as illustrated in 504B of FIG. 5B).

The adaptive sequence number engine 108 may then use this determination result to determine the adaptive size of the next list of sequence numbers 116 for a projected future time period 114. In some embodiments, the adaptive sequence number engine 108 may increase, decrease, or maintain the original size of the cache/data structure 104 for the newly determined adaptive size based at least in part upon one or more factors. In this example illustrated in FIG. 1, the original size of the data structure 104 accommodates twenty (20) sequence numbers, and the newly determined adaptive size of the data structure accommodates eighty (80) sequence numbers. In some of these embodiments, these one or more factors may include, for example, how quickly sequence numbers were consumed in the current time period (e.g., 100 in FIG. 1), the length of the projected future time period (114), the current nextval or the last sequence number consumed, the current high-watermark indicative of the largest sequence number that has been allocated to a data structure for consumption, and/or any other suitable factors, or any combinations thereof.

With the adaptive size of the next list of sequence numbers, the first cache/data structure 104 may be reconfigured into the second cache/data structure 104A to accommodate the next list of sequence numbers. A nextval pointer 120 may be moved to point to the next available sequence number ("21" in this example in FIG. 1) for the computing entity 102 to consume.

The consumption information that is used to determine the next set of sequence numbers may comprise any suitable information regarding past consumption. In one embodiment, the consumption information comprises a rate of consumption for a previous set of sequence numbers (e.g., number of sequence values consumed per second in the previous time period). In an alternate embodiment, the consumption rate may be derived as an aggregated or composite rate value established over any number of previous consumption cycles.

The projected time period may correspond to any suitable time period for computation and analysis purposes. In one embodiment, the projected time period corresponds to a fixed next time period, e.g., a fixed 10 second time period.

In an alternative embodiment, the time period may be configurable, e.g., configured manually by a user. In yet another embodiment, the time period may be adaptively determined. For example, during a period of high projected volatility with respect to consumption or consumption rates, the next time period may be set to a relative low time duration. However, during a period of low projected volatility, the next time period may be set to a longer time duration.

With one current embodiment, the next set of sequence numbers can therefore be established by multiplying a rate of consumption by the projected time period.

Figure 2:
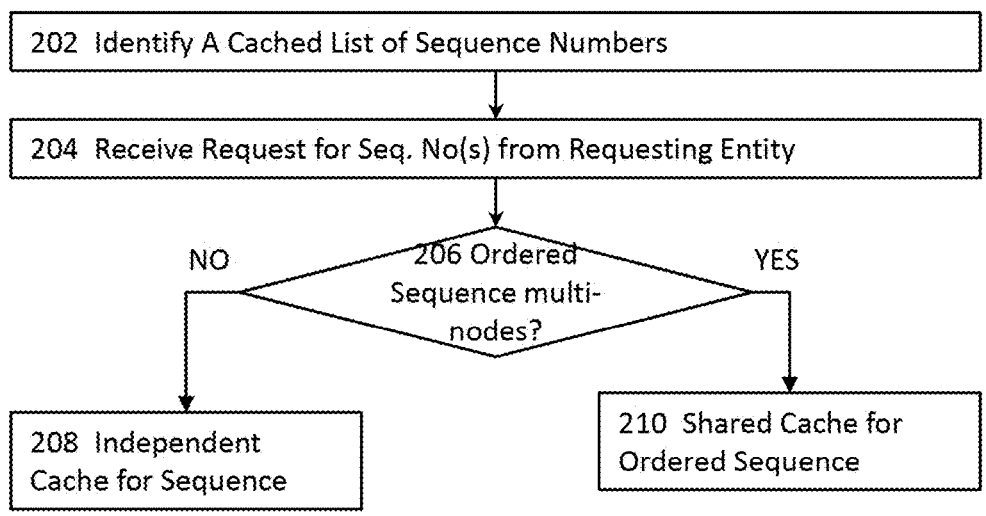
FIG. 2 illustrates a high-level block diagram for adaptively provisioning sequence numbers in a clustered database environment, according to some embodiments of the present disclosure.

FIG. 2 illustrates a high-level block diagram for adaptively provisioning sequence numbers in a clustered database environment, according to some embodiments of the present disclosure. The high-level block diagram illustrated in FIG. 2 applies to both ordered sequences and unordered sequences across multiple nodes. In these embodiments illustrated in FIG. 2, a cached or stored list of sequence numbers may be identified at 202. In some of these embodiments, a cached list of sequence numbers may be stored in a cache memory.

It shall nevertheless be noted that part of the present disclosure refers to the term "cache" or "cached" to indicate the temporary storage of sequence numbers for consumption, and that although such temporary storage may be accomplished with a cache memory, the use of the term "cache" or "cached" does not intend to limit the scope of other embodiments or the scope of the claims unless otherwise explicitly described or recited. In some embodiments, sequence numbers may be generated by, for example, a sequence number generator of a database system, and the generated sequence numbers may be stored in a persistent or non-persistent storage for the database environment to use. In these embodiments, a list of these generated sequence numbers may be read from the persistent storage and placed in a temporary storage for consumption by computing entities. Such a temporary storage may be accomplished with any suitable data structure stored in any non-transitory computer readable media so long as the database environment need not return to the persistent storage to retrieve one or more sequence numbers every time a request for sequence numbers is received.

A request for one or more sequence numbers may be received from a requesting entity at 204. The request from the requesting entity may be fulfilled by obtaining the one or more sequence numbers from the list of sequence numbers identified at 202. A requesting entity may include, for example, a session, an instance, or a computing node, etc. For example, a requesting entity may be a database session of a database instance, an application session of an application instance, a service session of an instance of a service or microservice, an instance of an application, an instance of a database, an instance of a service or microservice, or any other suitable computing entities.

A determination may be made at 206 to decide whether the request received at 204 is for sequence numbers that are ordered across multiple instance/nodes, or not across multiple instances/nodes. As described above, an "ordered" sequence enforces a strict ordering on the sequence values (or sequence numbers) returned. For example, if entity one advances the sequence before session two, then session one sees a sequence value that is earlier in the sequence's value range than session two. Sequence ordering may be enforced by serializing on the sequence's nextval (or next value).

In some embodiments where the request received at 204 is directed to a sequence number not ordered across nodes, then an independent cache/data structure (independent from other nodes) may be utilized at 208 to store sequence numbers for consumption. For example, instance one may correspond to a first data structure, and instance two may correspond to a second data structure, where the first and the second data structures are independently filled with their respective lists of sequence numbers for consumption. In these embodiments, sequence ordering across nodes is not strictly enforced.

For example, the first data structure may be populated with sequence numbers 1-20 for instance one, and the second data structure may be populated with sequence numbers 41-60 for instance two. In this example, session one of instance one may acquire a lock, consumes sequence number "1", and then releases the lock. Session two of instance two may acquire the lock after session one has released the lock, consumes the next available sequence number "41", and releases the lock. Session one may re-require the lock after session two has released the lock and consumes the next available sequence number "2". In this example, the sequence values in the database environment are then "1"-"41"-"2" so the sequence ordering is not enforced.

In some embodiments where the request received at 204 is directed to an ordered sequence number, a "shared" mechanism may be adopted at 210. In some embodiments, the "shared" mechanism is adopted based at least in part upon one or more other entities that also issue and consume sequence number(s). It shall be noted that the "shared" data structure mechanism does not necessarily refer to using the same data structure for multiple computing entities in some embodiments. In these embodiments, a "shared" data structure mechanism for temporarily storing sequence numbers for consumption includes adaptively determining a new list of ordered sequence numbers having a newly determined adaptive size of a data structure for a requesting entity based at least in part upon how quickly the current sequence numbers were consumed and configuring the data structure for a separate entity with the newly determined adaptive size and populating at least a portion of the new list of ordered sequence numbers to the configured data structure. The past consumption rate, in some embodiments, may therefore be based at least in part upon the consumption by multiple nodes/entities.

In some embodiments where the request received at 204 is directed to a sequence number not ordered across multiple nodes, an independent data structure may be adopted for an entity at 208. In some embodiments, each entity (e.g., instance) may correspond to a data structure so that the entity or one or more child entities (e.g., sessions of an instance) may consume sequence numbers stored therein. Each data structure may be populated with its own sequence numbers obtained from the database environment.

For example, each of multiple instances in a clustered database environment may correspond to a respective data structure (e.g., cache). These respective data structures may be respectively populated with corresponding lists of sequence numbers where each corresponding list of sequence numbers is obtained from the database environment (e.g., from a sequence number generator). In this example, multiple child entities such as multiple sessions of an instance may independently consume the list of sequence numbers stored in the cache for the instance.

For example, a first data structure may be populated with sequence numbers 1-20 for a first instance in a clustered database environment, and a second data structure may be populated with sequence numbers 41-60 for a second instance in the clustered database environment. The first instance or one or more sessions thereof may independently consume the sequence numbers in the first data structure. Similarly, the second instance or one or more sessions thereof may also independently consume the sequence numbers in the second data structure. When the sequence numbers of one data structure have been fully consumed, the data structure may be independently, adaptively resized with a different size, and the adaptively resized data structure may be populated with a new list of sequence numbers independent of other instances in the clustered database environment. More details about reference numerals 208 and 210 will be described below.

Figure 3:
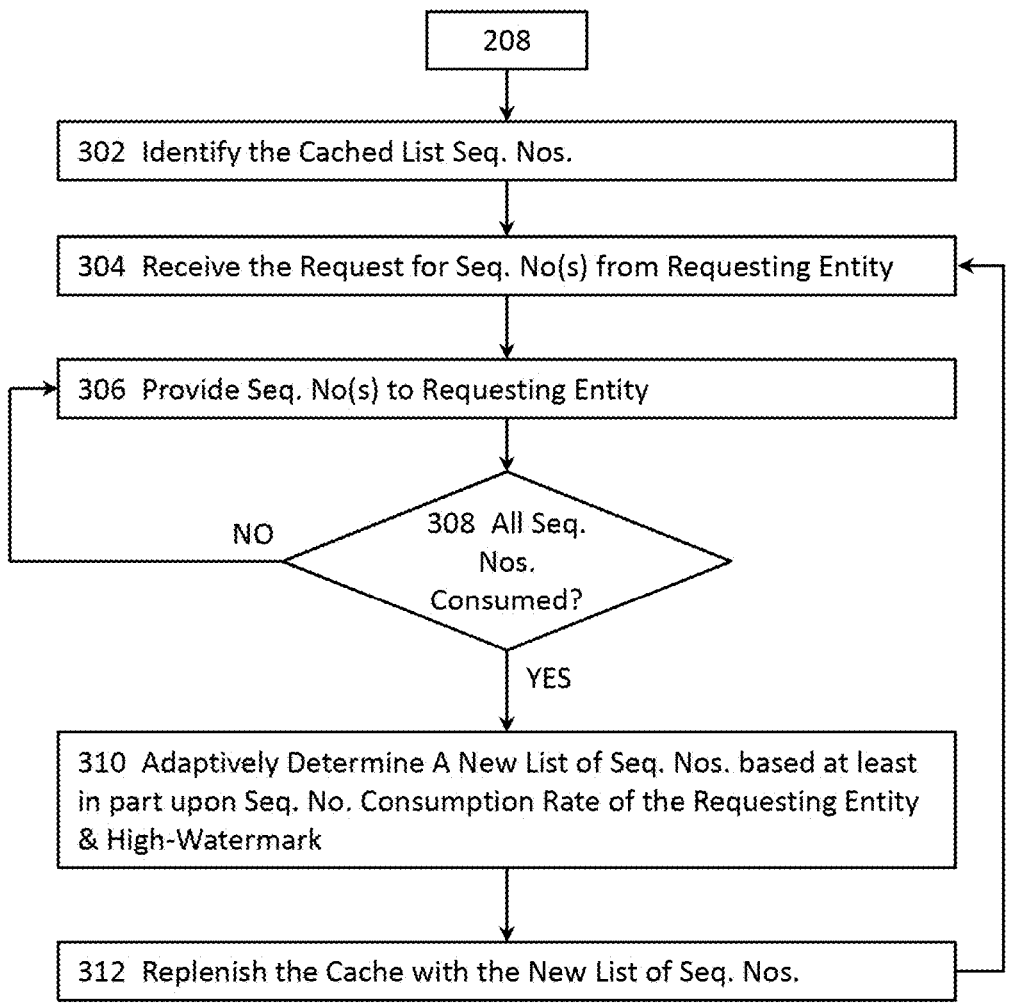
FIG. 3 illustrates more details about adaptively provisioning unordered sequence numbers with independent cache based at least in part upon the high-watermark for sequence numbers in a clustered database environment, according to some embodiments of the present disclosure.

FIG. 3 illustrates more details about adaptively provisioning unordered sequence numbers with independent cache based at least in part upon the high-watermark for sequence numbers in a clustered database environment, according to some embodiments of the present disclosure. More specifically, FIG. 3 illustrates more details about the independent data structure mechanism for unordered sequence numbers in FIG. 2. In these embodiments, a data structure populated with sequence numbers may be identified at 302. A request for one or more sequence numbers may be received at 304 from a requesting entity. For example, a session of an instance may issue a request to obtain one or more sequence numbers from the data structure identified at 302.

A requested sequence number, if available in the data structure, may be provided to the requesting entity at 306. In some embodiments where the request for sequence numbers received at 304 has not been fulfilled, a determination may be made at 308 to decide whether the sequence numbers in the data structure have all already been consumed. If the determination result is negative (e.g., the data structure still includes one or more available sequence numbers), the process may return to 306 to continue to provide the next available sequence number to the requesting entity.

On the other hand, if the determination is affirmative at 308 (e.g., all sequence numbers populated in the data structure have been consumed), a new list of sequence numbers may be adaptively determined at 310 with possibly a different size (e.g., a size that accommodates a different total number of sequence numbers). The adaptive determination at 310 may be performed based at least in part upon one or more factors such as how quickly the sequence numbers in the data structure identified at 302 were consumed and/or a high-watermark of sequence numbers in the database environment, or any other desired or required criteria.

With the new list of sequence numbers adaptively determined at 310, the data structure may be reconfigured with the newly determined adaptive size and replenished with the new list of sequence numbers at 312. The process may return to 304 to receive a request for one or more sequence numbers. If the original request identified above has not been fulfilled, the process may proceed through one or more of the previous actions, if necessary, until the request is fulfilled. On the other hand, if the original request has already been fulfilled before the process returns to 304, a new request for one or more sequence numbers may be identified at 304, and the process repeats for this new request.

In some embodiments, the process illustrated in FIG. 3 may be independently performed for each data structure in the database environment for one or more computing entities to consume the sequence numbers stored in the data structure, independent of and separate from other data structures storing their respective lists of sequence numbers. In these embodiments, a data structure may be accessed by computing entities supported by the data structure; each data structure may also be independently, adaptively resized to have a larger size, a smaller size, or the same size based at least in part upon the aforementioned one or more factors or criteria; and each data structure may then be populated with new lists of sequence numbers.

Figure 4:
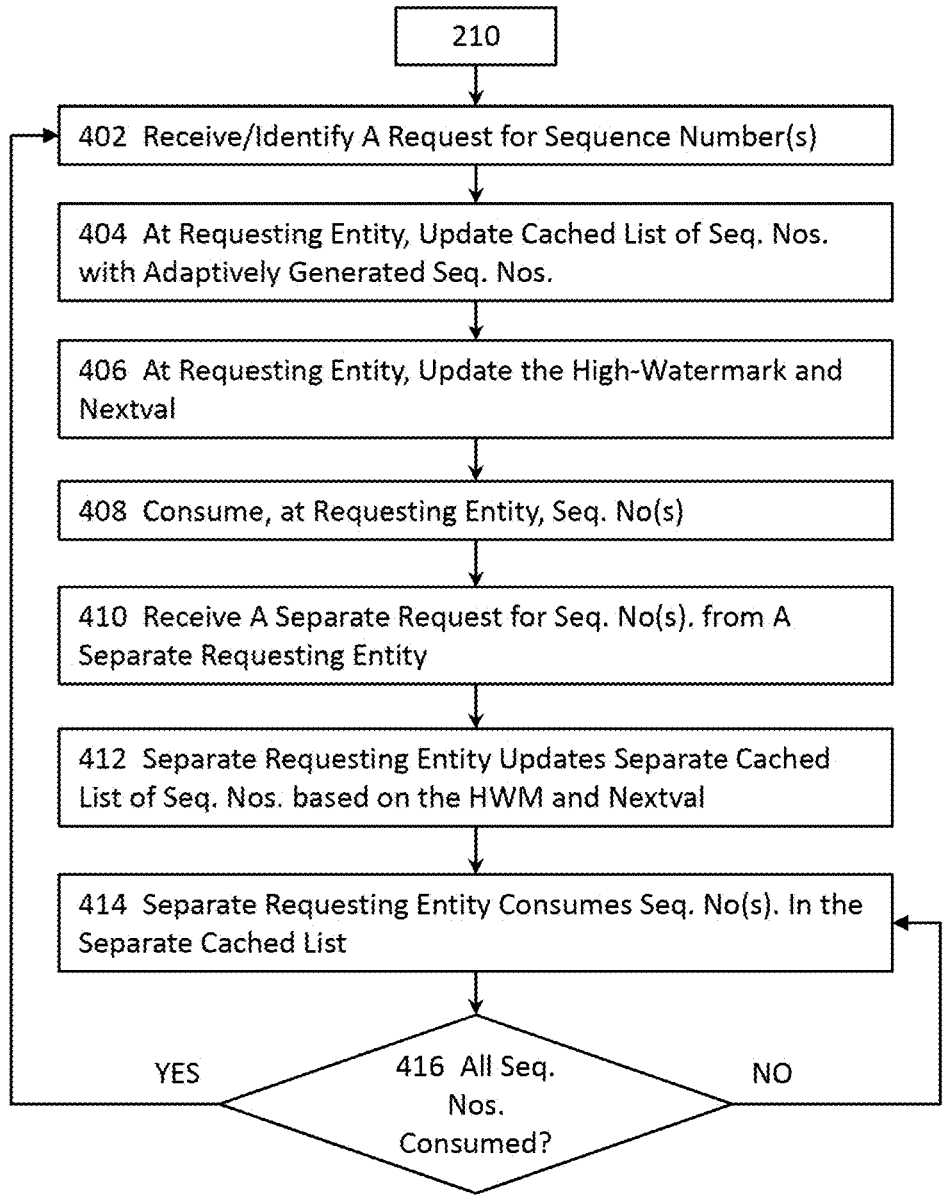
FIG. 4 illustrates more details about adaptively provisioning ordered sequence numbers with shared cache based at least in part upon one or more other caches for sequence numbers in a clustered database environment, according to some embodiments of the present disclosure.

FIG. 4 illustrates more details about adaptively provisioning ordered sequence numbers with shared cache based at least in part upon one or more other caches for sequence numbers in a clustered database environment, according to some embodiments of the present disclosure. More specifically, FIG. 4 illustrates the shared data structure mechanism for ordered sequence numbers, according to some embodiments of the present disclosure.

In these embodiments, a request for one or more sequence numbers may be identified at 402 from a requesting entity. For example, a request for one or more sequence numbers may be received from a requesting session of a first instance and/or node at 402. A cached list of sequence numbers may be updated at 404 for the requesting entity with sequence numbers that are adaptively generated. In some embodiments, an adaptive size of a data structure may be adaptively determined based at least in part upon, for example, how quickly the current sequence numbers were consumed as described above with reference to FIGS. 2-3.

With the cached list of sequence numbers updated at 404, other information pertaining to the adaptively generated sequence numbers may also be updated at 406 for the requesting entity. For example, the high-watermark, the next available sequence number, etc. may be updated at 406 for the requesting entity.

The requesting entity may then start consuming one or more sequence numbers in the cached list of sequence numbers at 408. If the requesting entity fully consumed all of the sequence numbers in the cached list of sequence numbers to fulfill its request, the cached list may be further updated with a new batch of adaptively generated sequence numbers as similarly described with reference to 404. On the other hand, in some embodiments where the requesting entity does not fully consume all of the sequence numbers in the cached list of sequence numbers, a separate request for one or more sequence numbers may be received at 410 from a separate requesting entity.

This separate requesting entity may update a separate cached list of sequence numbers at 412 based at least in part upon the high-watermark and the next available sequence number (nextval). This separate requesting entity may start consuming one or more sequence numbers from the updated cached list of sequence numbers at 414.

A determination may be made to decide whether all the sequence numbers in the updated cached list of sequence numbers have been fully consumed at 416. In some embodiments where the determination result is negative (e.g., not all of the sequence numbers have been consumed), the process may return to 414 to continue to consume the sequence number(s). On the other hand, if it is determined that all of the sequence numbers in the cached list of sequence numbers have been fully consumed at 416, the process may return to 402 where the separate request is again identified, and the separate requesting entity may again update its cached list of sequence numbers at 404, and update the high-watermark and the next available sequence number at 406 so that the separate requesting entity may again consume one or more sequence numbers at 408 to fulfill the separate request. The process then repeats the remaining actions from 410 for one or more other requests in an identical or substantially similar manner as that described above for FIG. 4.

Figure 5A:
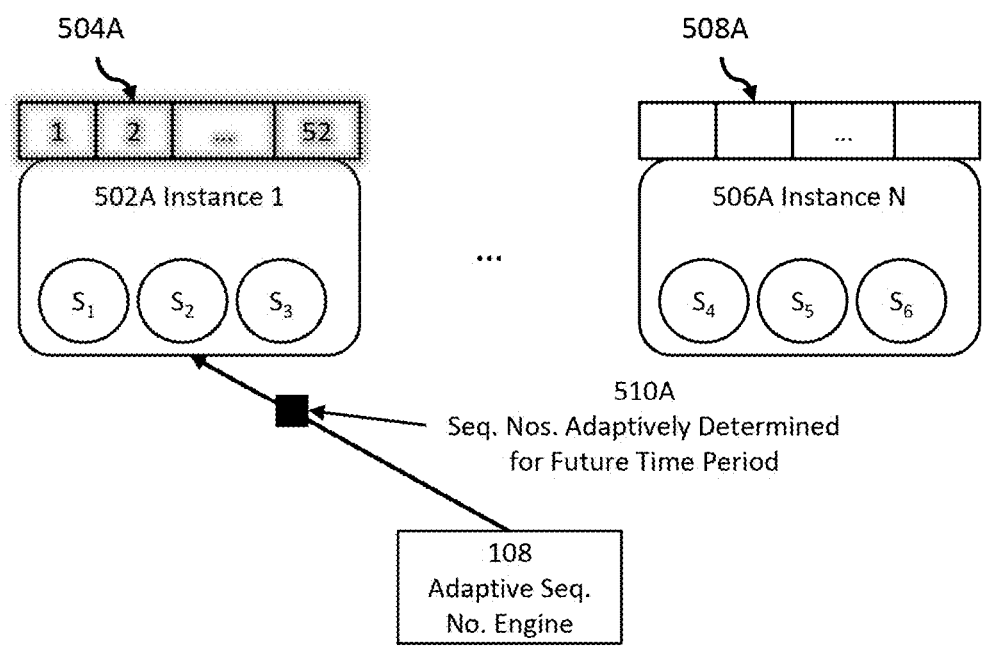
FIGS. 5A-5D illustrate some examples for adaptively provisioning unordered sequence numbers with independent cache based at least in part upon the high-watermark for sequence numbers, according to some embodiments of the present disclosure.

FIGS. 5A-5D illustrate some examples for adaptively provisioning sequence numbers with an independent cache based at least in part upon the high-watermark for sequence numbers, according to some embodiments of the present disclosure. More particularly, FIG. 5A illustrates an example where computing entities in a database environment request sequence numbers not ordered across nodes and/or instances. In this example, the computing entities independently consume their respective sequence numbers stored in their respective data structures. Moreover, the size of each data structure for its corresponding computing entity is independently, adaptively resized as described herein.

In these embodiments, the database environment includes one or more instances (e.g., 502A, 506A, etc.) An instance (e.g., instance one 502A, instance N 506A, etc.) may correspond to one or more sessions (e.g., $S_1$, $S_2$, or $S_3$, etc. for instance one 502A or $S_4$, $S_5$, or $S_6$, etc. for instance one 506A). The examples illustrated in FIGS. 5A-5D apply with full and equal effects to a database environment having one computing entity (e.g., a session, an instance, a computing node, etc.) or multiple computing entities.

A computing entity may correspond to a data structure (e.g., cache 504A for instance one 502A, cache 508A for instance N 506A, etc.) that stores a plurality of sequence numbers obtained from, for example, an sequence number engine (e.g., 108 in FIG. 1). When the computing entity request a sequence number, the next available sequence number, if available, in the data structure is provided to the computing entity to fulfill its request.

The example illustrated in FIG. 5A shows the case where all the sequence numbers stored in the data structure 504A have been consumed by the computing entity (e.g., one or more of the sessions $S_1$, $S_2$, or $S_3$, etc.) At the time or after all the sequence numbers stored in the data structure are consumed, the adaptive sequence number engine (108) may determine an adaptive size for the data structure 504A, and a new list of sequence numbers (510A) may be obtained from a disk or other storage device storing sequence numbers generated by, for example, a sequence number generator based at least in part upon the newly determined adaptive size for the data structure 504A. This new list of sequence numbers 510A may then be populated into the data structure 504A, and the next available sequence number ("Nextval") pointer may be reset to the first available sequence number (e.g., the smallest available sequence number in the new list) for the next requesting entity to consume.

Figure 5B:
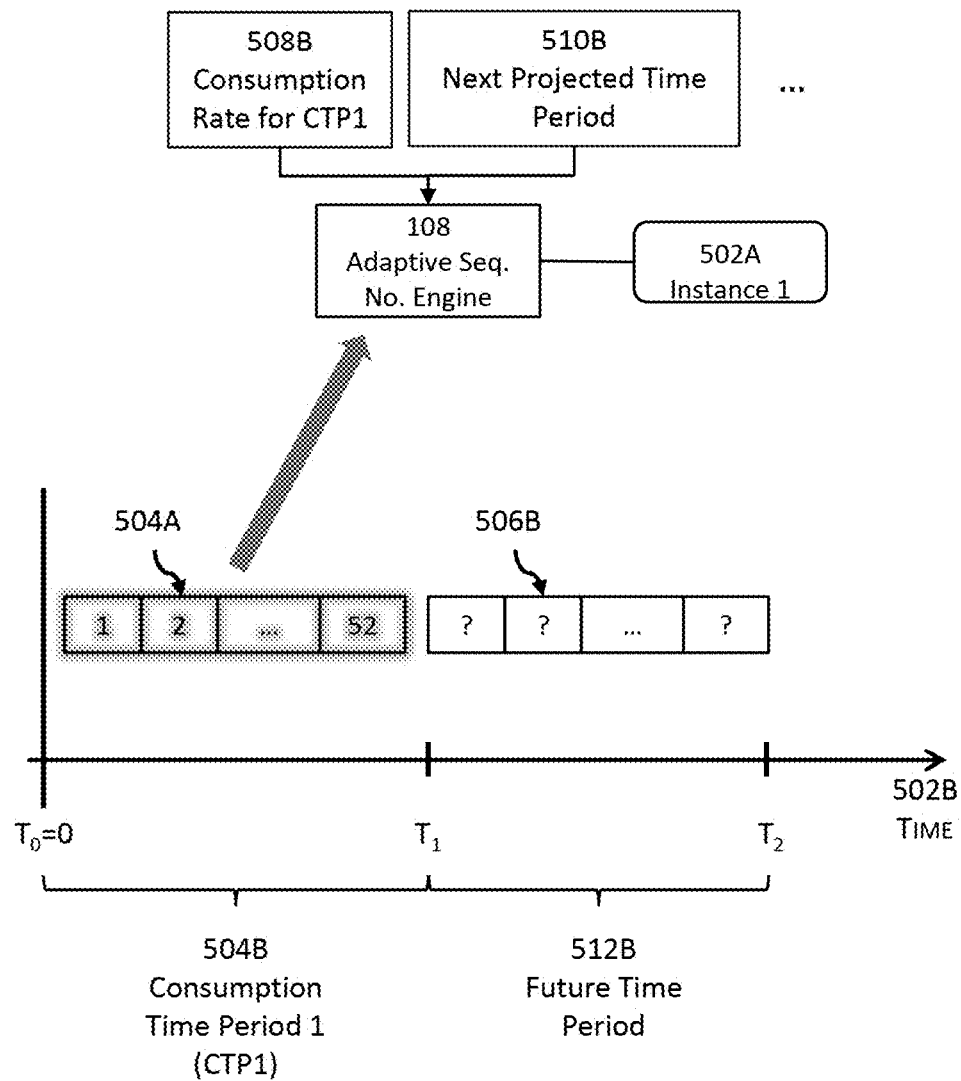

FIG. 5B continues the example from FIG. 5A and illustrates that at the time or after all the sequence numbers stored in the data structure are consumed, the adaptive sequence number engine (108) may determine an adaptive size for the data structure 504A based at least in part upon one or more factors. These one or more factors may include, for example, how quickly the existing sequence numbers in the data structure 504A were consumed by the computing entity (e.g., instance one 502A), how long the future time period for which the next list of sequence numbers will be generated, or any other desired or required factors, or any combinations thereof. For example, the one or more factors may include the consumption rate 508B, the next projected time period 512B, etc.

In some embodiments, the consumption rate of sequence numbers may be determined based on the time period 504B during which the existing sequence numbers in the data structure were consumed. For example, assuming the first sequence number ("1" in this example) of the existing sequence numbers in the data structure 504A was first consumed at time $T_0$, and the last sequence number ("52" in this example) was consumed at time $T_1$ so that a total of N sequence numbers have been fully consumed between $T_1$-$T_0$, the consumption rate of the existing sequence numbers in data structure 504A may be determined to be:

$$N/(T_1-T_0)$$

For the next projected time period $(T_2-T_1)$ 510B for which a new adaptive size for the data structure 504A is to be determined is $T_2-T_1$, the adaptive size of the data structure may be determined to be:

$$N*(T_2-T_1)/(T_1-T_0)$$

As it may be appreciated by those skilled in the art, the adaptive size of a data structure described herein may increase or decrease. In some embodiments where a lower threshold size "s" (or a "lower bound") may be set to control the smallest size of the data structure 504A, the adaptive size of the data structure may be determined to be:

$$Max(s,N*(T_2-T_1)/(T_1-T_0))$$

In these embodiments, the size of the data structure is determined not to decrease below the lower threshold size even though the adaptive sequence number engine may decrease the adaptive size. In some of these embodiments, a lower threshold ratio "s", rather than a lower threshold size, may also be set to limit the ratio at which the size of a data structure may decrease. For example, a lower threshold ratio may be set in such a way that a new adaptive size of a data structure will not drop below, for example, one-half of the immediately previous size.

In addition or in the alternative, an upper threshold size or an upper threshold ratio "S" may be set to control the maximize size or the maximum rate of size increase for the data structure. For example, the size of a cache/data structure may be limited not to increase beyond 1,000 sequence numbers or not to increase more than ten times (10×) of the immediately preceding size of the data structure.

Either or both of the next projected time period 512B and the consumption time period 504B may have their respective default values and may be customizable by, for example, a user in some embodiments. In addition or in the alternative, either or both of the next projected time period 512B and the consumption time period 504B may be customized programmatically by the database system (e.g., by the adaptive sequence number engine 108 in FIG. 1) based at least in part upon, for example, one or more criteria such as a performance metric of the database system alone, a likelihood of productivity alone, a balanced account for the performance of the database system and a likelihood of productivity loss, heuristics, historical patterns of the database performance metric and/or the likelihood or actual occurrence of productivity losses, or any other suitable criteria, or any combinations thereof.

A new list of sequence numbers (510A) may be obtained from a disk or other storage device storing sequence numbers generated by, for example, a sequence number generator based at least in part upon the newly determined adaptive size for the data structure 504A. This new list of sequence numbers 510A may then be populated into the data structure 504A, and the next available sequence number ("Nextval") pointer may be reset to the first available sequence number (e.g., the smallest available sequence number in the new list) for the next requesting entity to consume.

Figure 5C:
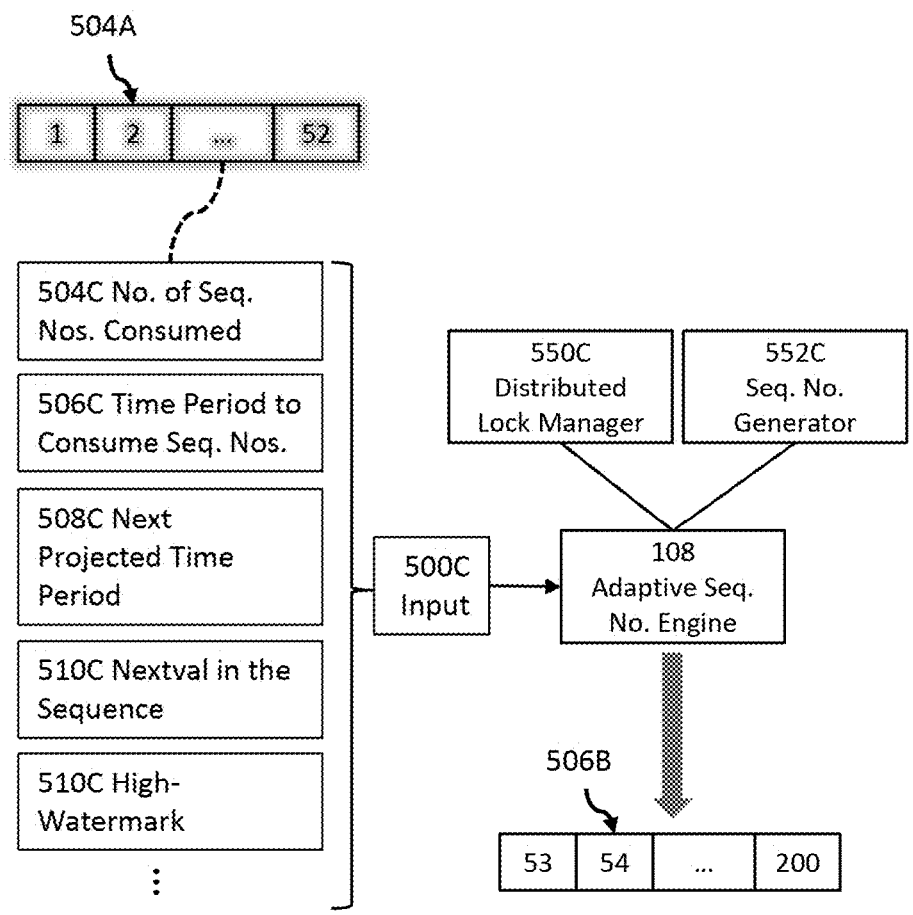

FIG. 5C continues the example and illustrates various example inputs 500C that an adaptive sequence number engine 108 may consider in determining a new, adaptive size for a data structure (e.g., 504A) so that the new data structure (e.g., 506B) may accommodate a new list of sequence numbers based at least in part upon this new, adaptive size.

In determining the new, adaptive size, the adaptive sequence number engine 108 may consider the input 500C that may include, for example, one or more factors. These one or more factors may include, for example, the total number of sequence numbers consumed (504C), the time period or duration during which the total number of sequence numbers were consumed (506C), the next projected time period (508C), the next available sequence number in the sequence (510C), the high-watermark 510C, or any other desired or required factors, or any combinations thereof.

In this example, the adaptive sequence number engine 108 may consider one or more of the aforementioned factors as an input 500C to the adaptive sequence number engine 108 and determines to increase the current size (that accommodates 52 sequence numbers) to the new, adaptive size that accommodates 148 sequence numbers (e.g., 53, 54, . . . , 200) as the data structure 506B.

Figure 5D:
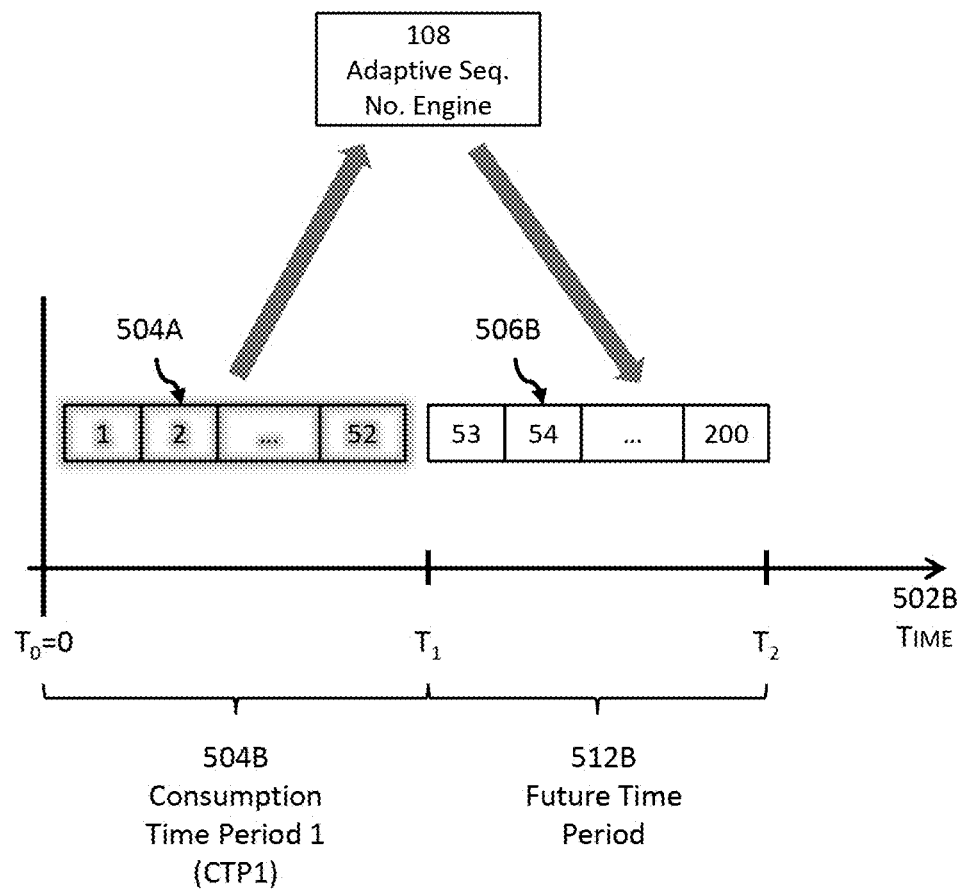

FIG. 5D illustrates the example where once the new, adaptive size is determined for the data structure 506B for the next future time period 512B, a new list of sequence numbers may be populated into the data structure 506B as shown in FIG. 5D.

Figure 6A:
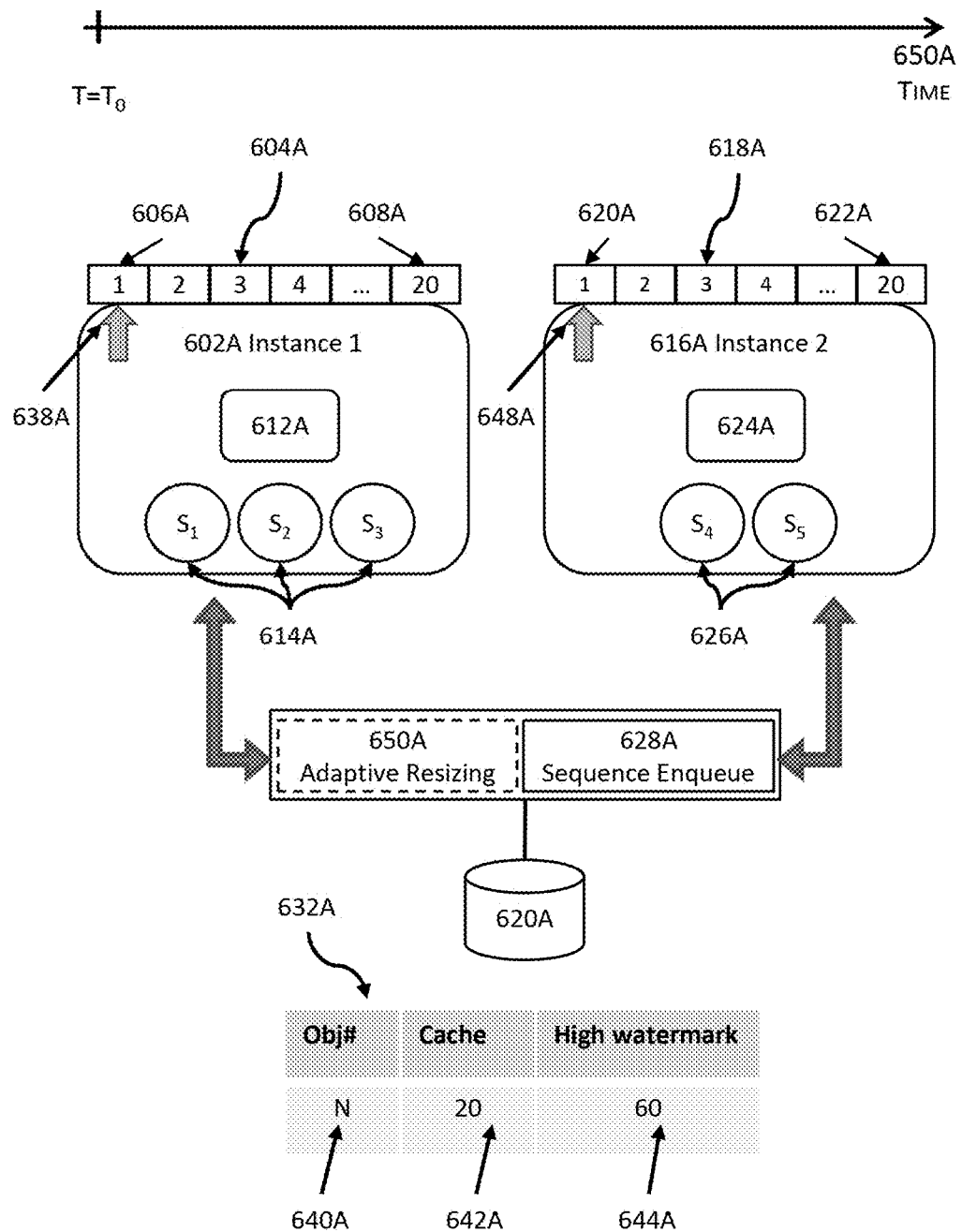
FIGS. 6A-6G illustrate some examples for adaptively provisioning ordered sequence numbers with shared cache based at least in part upon one or more other caches for sequence numbers, according to some embodiments of the present disclosure.

FIGS. 6A-6G illustrate some examples for adaptively provisioning ordered sequence numbers with shared cache based at least in part upon one or more other caches for sequence numbers, according to some embodiments of the present disclosure. More particularly, FIG. 6A illustrates an example where a database environment includes a shared storage 620A and two instances (instance one 602A and instance two 616A) each having one or more entities (e.g., $S_1$, $S_2$, or $S_3$, etc. 614A for instance one 602A or $S_4$, or $S_5$, etc. 626A for instance two 616A) that may issue their respective requests for ordered sequence numbers. Again, it shall be noted that various embodiments described herein apply with full and equal effects to one or more computing entities where a computing entity may be a standalone entity in some embodiments or may correspond to a parent computing entity in some other embodiments. For example, a computing entity or an entity may include, for example, a process, a session (e.g., a session of a database instance, a session of an application instance, etc.), an instance, a computing node, etc.

In this example database environment illustrated in FIG. 6A, each instance may include its own instance of a distributed lock mechanism (DLM) (e.g., DLM1 612A for instance 602A, DLM2 624A for instance 616A, etc.) that may acquire a lock to access a sequence number.

An instance may correspond to its own data structure for storing ordered sequence numbers generated by, for example, a sequence number generator (e.g., the adaptive sequence number engine 108 in FIG. 1) that may determine and coordinate the data structures for the multiple instances requesting ordered sequence numbers in the database environment. For example, instance one 602A may correspond to a first data structure 604A, and instance two 616A may correspond to a second data structure 618A. A data structure temporarily stores a list of ordered sequence numbers generated by a sequence number generator and may comprise, for example, a cache with the head of the cache (606A or 620A) and the tail of the cache (608A or 622A) so that information corresponding to requests for ordered sequence numbers may be stored accordingly. It shall be noted that other suitable data structures may also be utilized, and that the present disclosure may refer to the term "cache" for the ease of description and illustration without limiting the scope of various embodiments described herein or the claims, unless otherwise explicitly described or recited.

In these embodiments illustrated in FIGS. 6A-6G, ordered sequences are enforced by using at least a "shared" cache mechanism. More specifically, the two caches (604A and 618A) may be initially configured with the same default size and populated with the same list of ordered sequence numbers (e.g., 1, 2, 3, . . . , 20 in this example in FIG. 6A). FIG. 6A further illustrates the example where no entities have requested ordered sequence numbers at time $T_0$ along the temporal axis 650A. As a result, the nextval pointer (pointer 638A for cache 604A and pointer 648A for cache 618A) are both pointing at the next available ordered sequence number "1".

FIG. 6A further illustrates that the database environment may further store data 632A such as the object identification or number 640A, the default or current cache size 642A, the high-watermark 644A, etc. At least some of the data 632A may be referenced by, for example, the adaptive sequence number engine 650A, the sequence number enqueuing mechanism 628A, etc. to facilitate the "shared" cache mechanism. The object number corresponds to an identifier for a particular sequence within the database system. It is noted that the database system may employ multiple separate sequences in various contexts within the system, and each separate sequence is represented as a separate row within structure 632A with a different object number. The cache column corresponds to the number of sequence numbers within a given cache for the sequence. The high watermark column identifies the high watermark for the sequence values for its respective sequence. In some embodiments, the structure 632A is represented on disk and is accessible by some or all of the distributed instances/nodes.

Figure 6B:
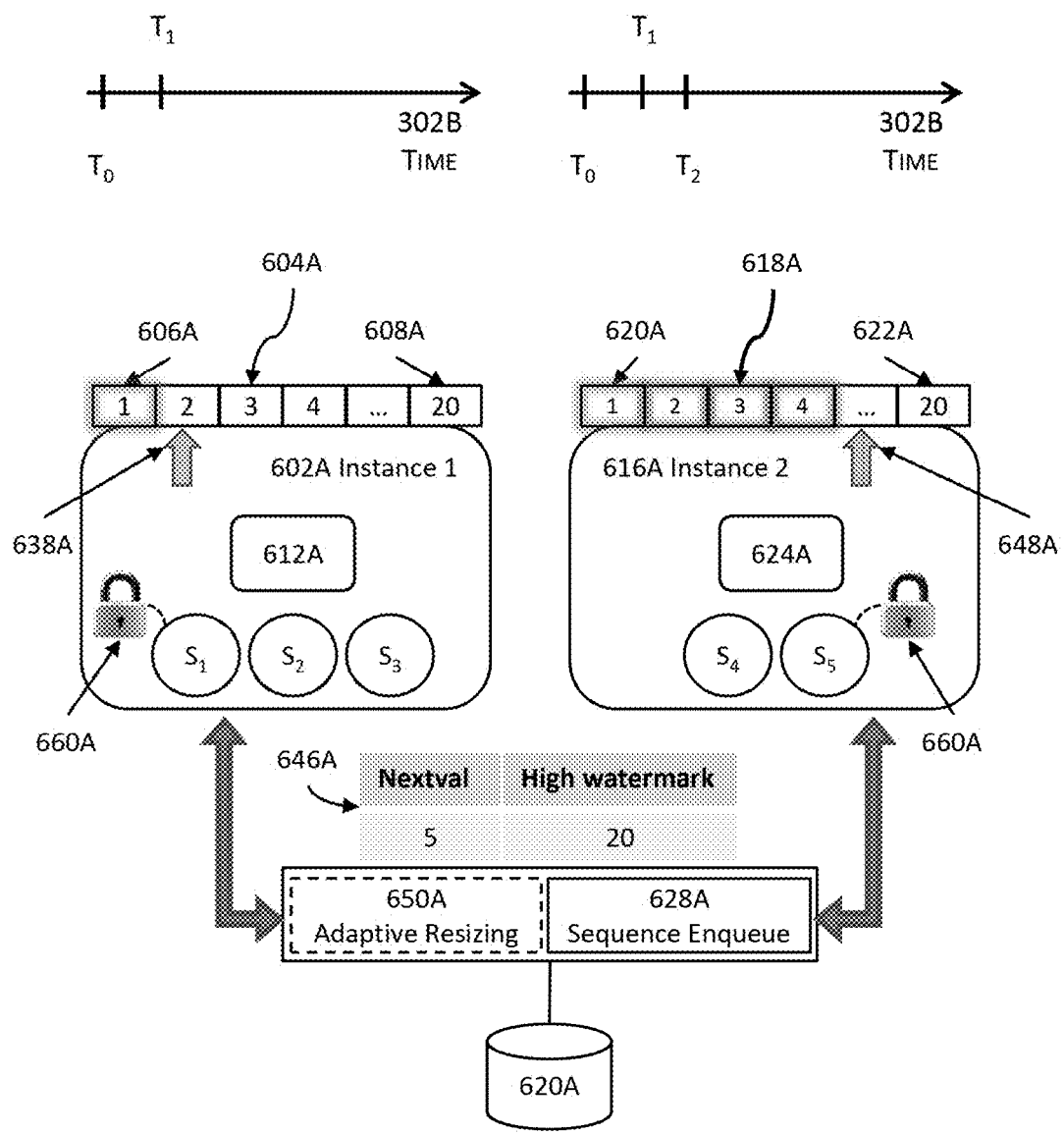

FIG. 6B continues with the example illustrated in FIG. 6A and illustrates that at time point $T_1$, it is determined that an entity corresponding to instance one 602A has acquired the lock 660A through the first DLM 612A and consumed a first ordered sequence number ("1" in this example) and moved the nextval pointer 638A to the next available ordered sequence number ("2" in this example). The entity may then release the lock 660A. Subsequently at time point $T_2$ after time point $T_1$, it is further determined that another entity corresponding to instance two 616A has acquired the lock 660A through the second DLM 624A and consumed three ordered sequence number ("2," "3," and "4" in this example) and moved the nextval pointer 648A to the next available ordered sequence number ("5" as shown in the data structure 646A). The current high-watermark indicating the maximum or largest ordered sequence number allocated is "20" in the example data structure 646A which may be referenced by the adaptive sequence number engine 650A and/or the sequence number enqueuing module 628A. It is noted that in some embodiments, the structure 646A corresponds to an in-memory structure that is accessible through a shared memory implementation to each of the instances/nodes.

Figure 6C:
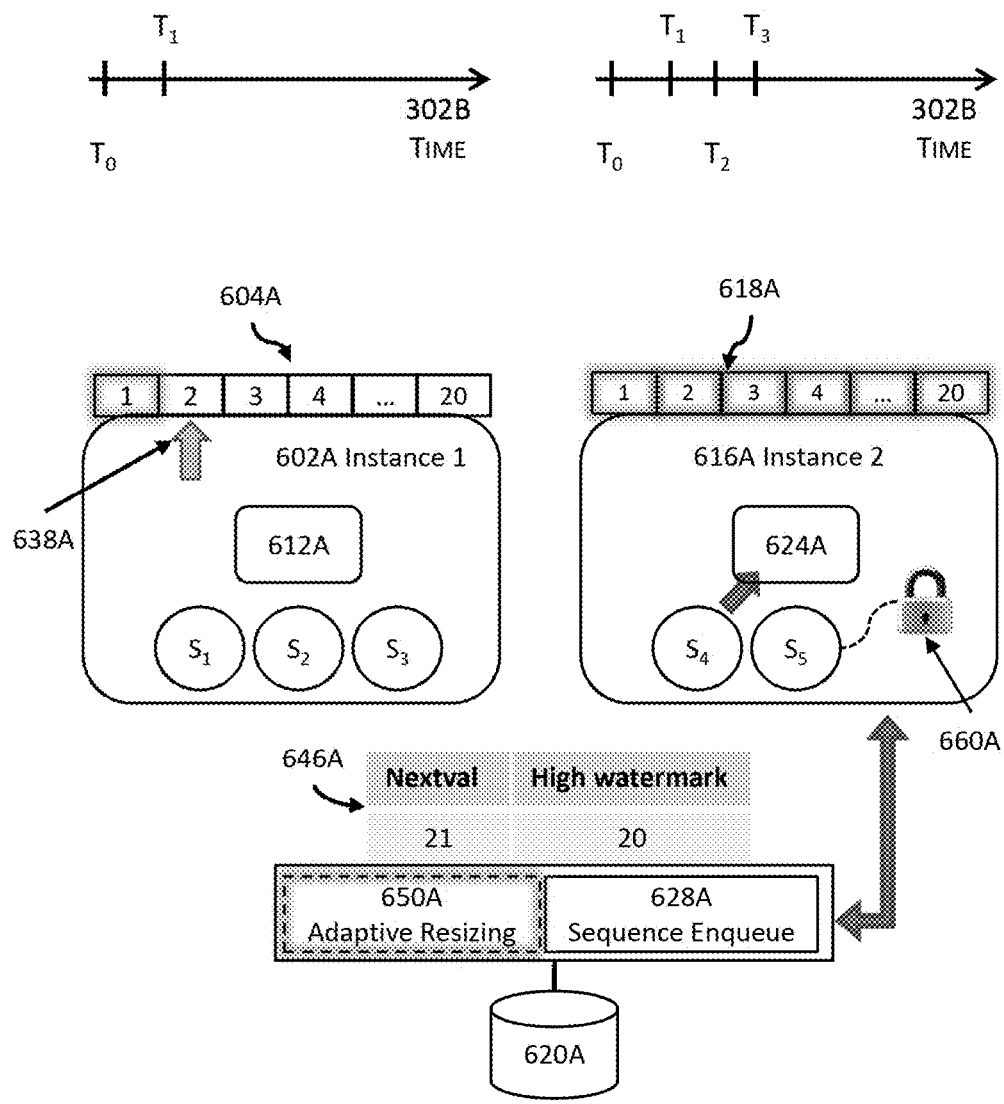

FIG. 6C further continues with the example illustrated in FIG. 6B. Subsequently at time point $T_3$ after time point $T_2$, it is further determined that the entity corresponding to instance two 616A continue to hold the lock 660A and consumes all the remaining ordered sequence number ("5," "6," . . . , "20" in this example). The nextval value in data structure 646A is thus updated to "21" while the high-watermark remains at 20 as the largest allocated ordered sequence number. Assuming that no other entities request ordered sequence numbers, FIG. 6C thus illustrates a transient state of the database environment after all the allocated ordered sequence numbers have been consumed.

It is noted that the nextval pointer 638A for the first data structure 604A may still currently correspond to what it (wrongly) believes is the next available ordered sequence number ("2" in this example), since no entity corresponding to instance one 602A has recently requested an ordered sequence numbers, and thus is out-of-date. As described in more detail below, there is no conflict since the first instance does not have any entities that are currently requesting a number and thus there is no harm to have its structure temporarily point to the wrong next available value at the current time, but as described in more detail below, will be corrected when the need arises in the future.

Figure 6D:
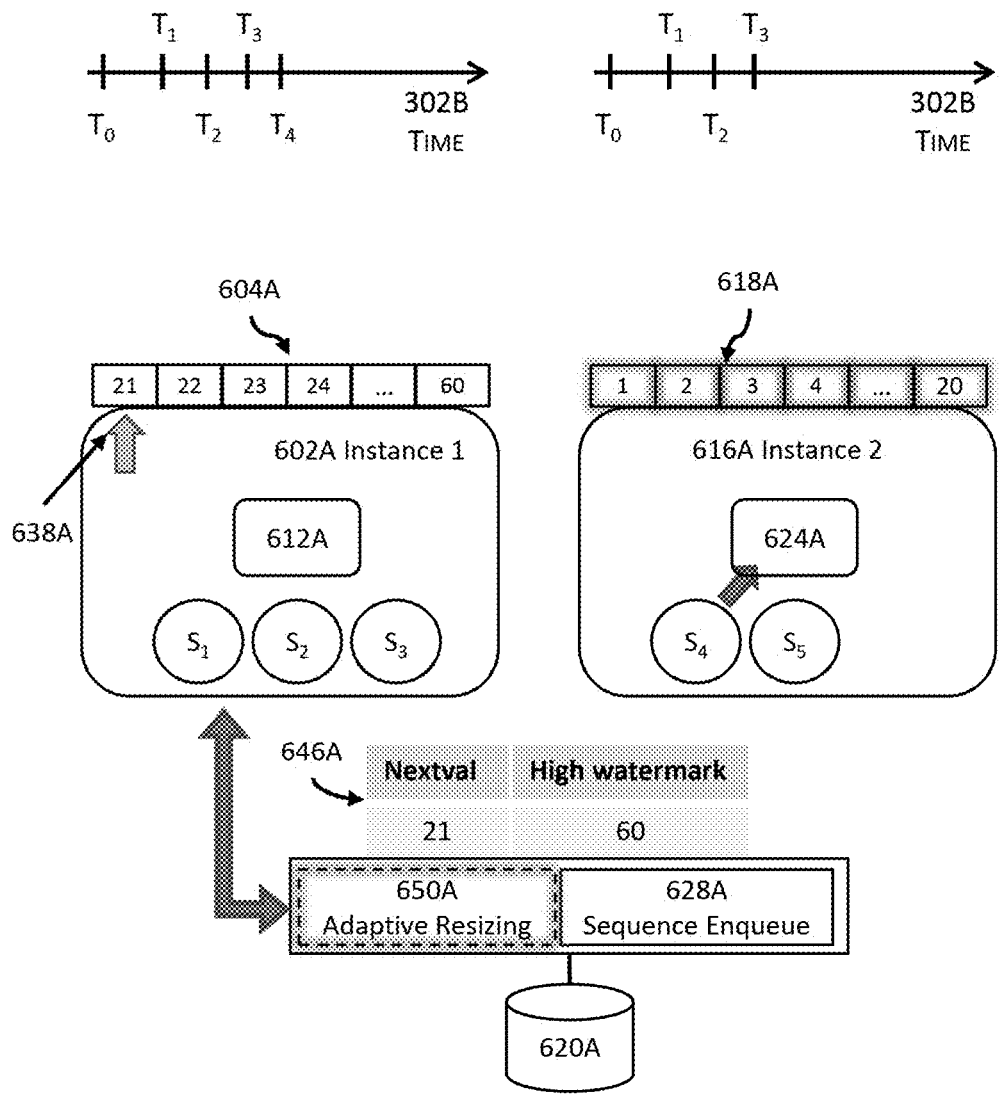

FIG. 6D continues with the example illustrated in FIG. 6C and further illustrates the example where an entity corresponding to instance one 602A now requests one or more ordered sequence numbers at time point $T_4$ after it is determined that all the ordered sequence numbers 1-20 have been consumed at time point $T_3$. As described above with reference to FIG. 6C, the nextval pointer 638A for the first data structure 604A may still correspond to the next available ordered sequence number ("2" in this example) as no entity corresponding to instance one 602A has requested ordered sequence numbers since the entity consumed the sequence number "1" at the time point $T_1$.

In this example, the adaptive sequence number engine 650A may determine an adaptive size for the data structure 604A by using identical or substantially similar approaches described herein. For example, the adaptive sequence number engine 650A may determine how quickly the current list of ordered sequence numbers were consumed (e.g., by a combination of both instances 1 and 2) and determine the adaptive size of the data structure 604A to be "40" for the next projected time period. The next list of ordered sequence numbers ("21," "22," . . . , "60") may thus be determined based on the Nextval "21" and the new size "40", and the high-watermark may be updated to the largest allocated ordered sequence number ("60" in this example). Because no other ordered sequence numbers have been consumed since time point $T_3$, the Nextval indicates the next available ordered sequence number to be "21".

It shall be noted that the data structure 618A still shows the previous, consumed 20 ordered sequence numbers in FIG. 6D. As described above, entities corresponding to instance two 616A have not requested ordered sequence numbers after all 20 ordered sequence numbers have been consumed at time point $T_3$. In some embodiments, the data structure 618A remains unchanged until the next time an entity corresponding to instance two 616A requests one or more ordered sequence numbers, although the data structure 604A has already been updated to accommodate the new list of 40 ordered sequence numbers. In some other embodiments, the database environment (e.g., the adaptive sequence number engine) may update multiple data structures with the new, adaptive size and the new list of ordered sequence numbers when a request for ordered sequence number(s) from one entity triggers the determination of the adaptive size of its corresponding data structure (e.g., 604A in this example).

Figure 6E:
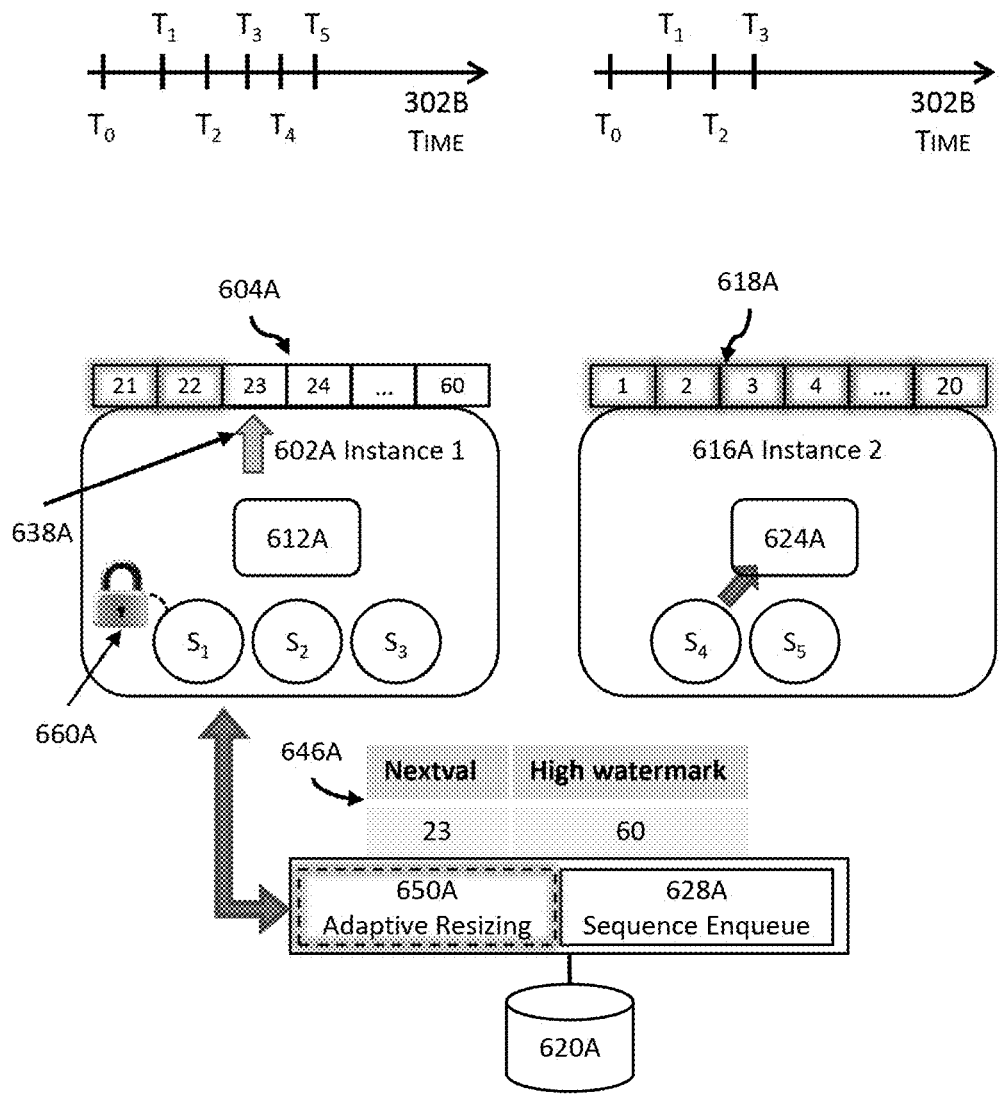

FIG. 6E continues the example in FIG. 6D and further illustrates that at a subsequent time point $T_5$, an entity corresponding to instance one 602A is determined to have acquired the lock 660A and consumed ordered sequence numbers 21 and 22 in the new list of ordered sequence numbers and moved the nextval pointer to the next available ordered sequence number ("23" in this example). The nextval in the data structure 646A is also updated to "23" to ensure that ordered sequences are enforced in the database environment.

Figure 6F:
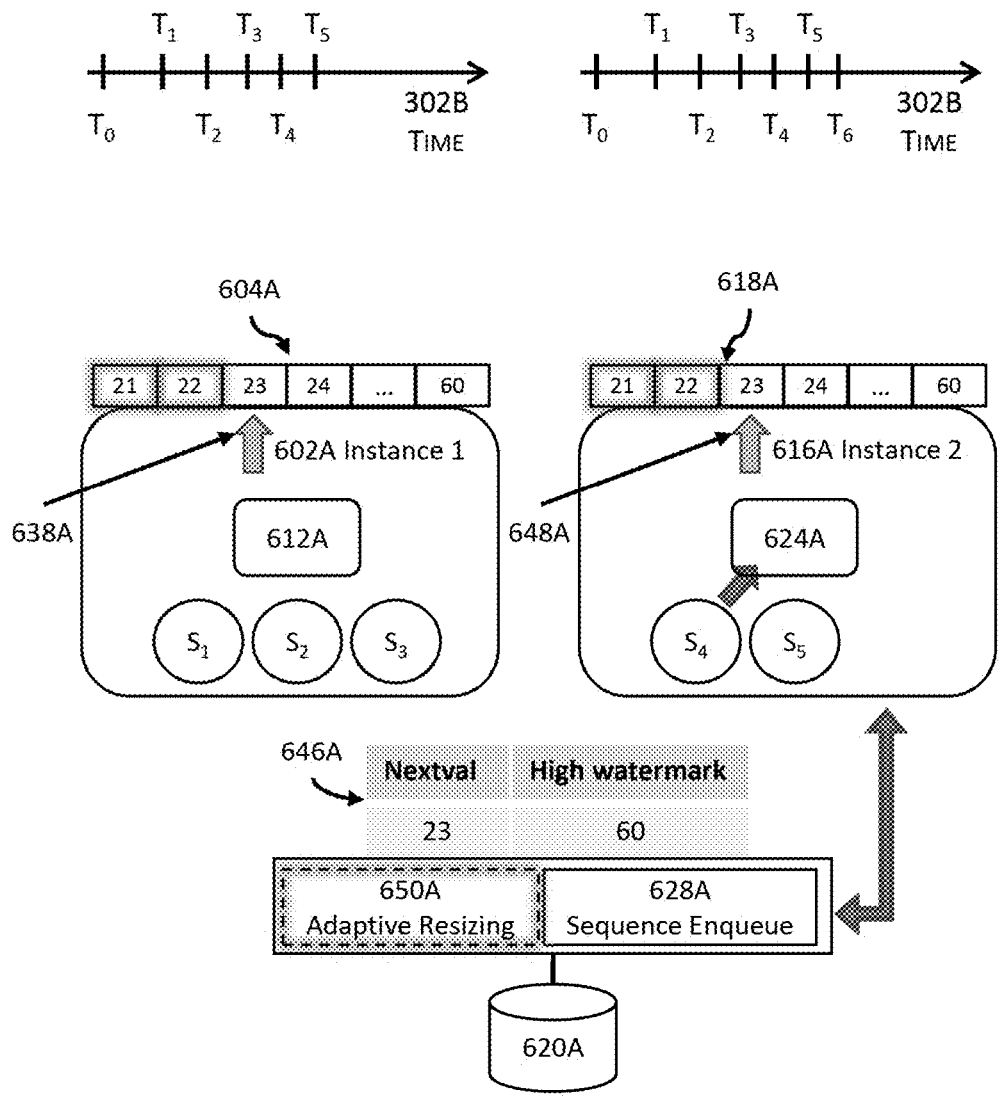
Figures 1, 6F:
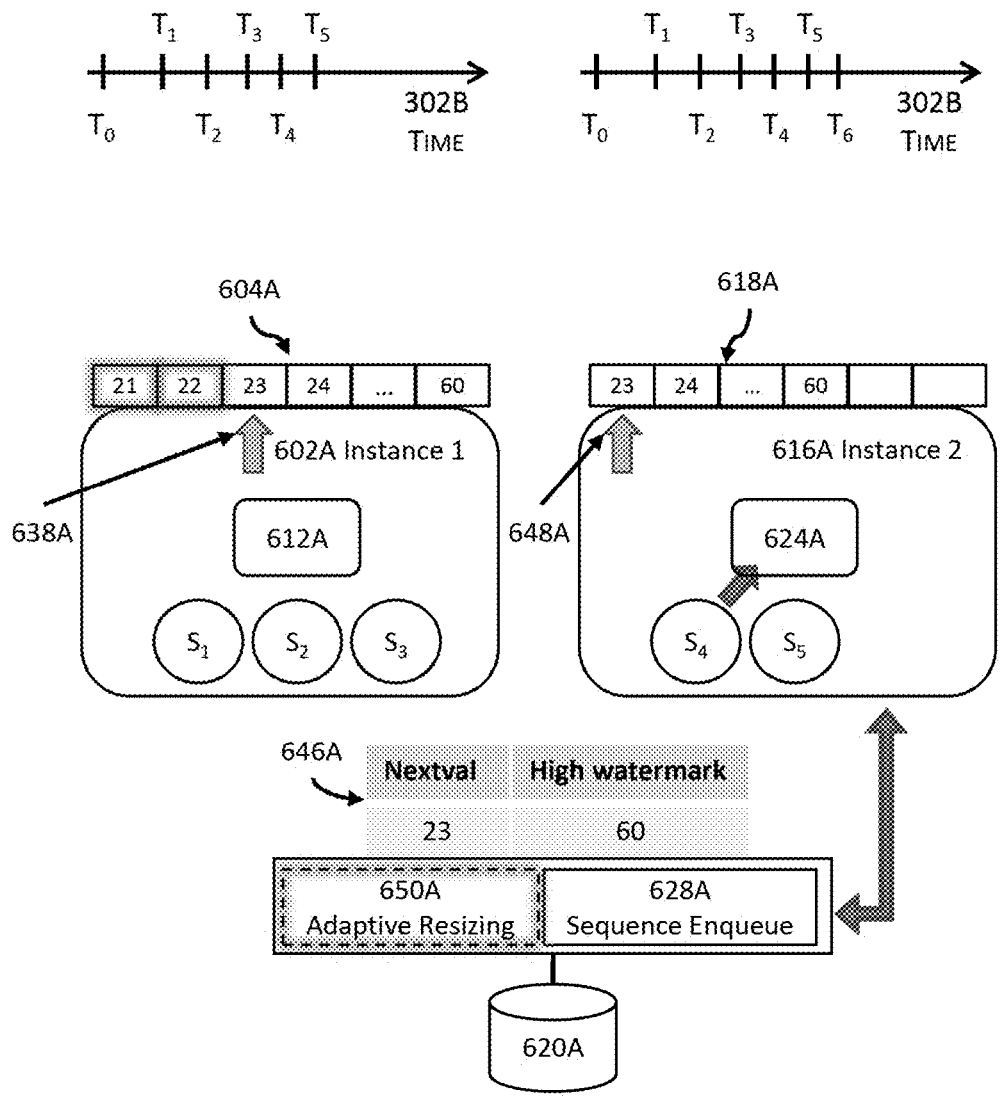

FIG. 6F continues the example in FIG. 6E and further illustrates that at a subsequent time point $T_6$, an entity corresponding to instance two 616A requests for one or more ordered sequence numbers at time point $T_6$. In these examples, the data structure 618A still shows the previous list of ordered sequence numbers (1-20) since the last access to ordered sequence numbers at time point $T_3$. The database environment (e.g., through the adaptive sequence number engine 650A) may reference the nextval "23" and the high-watermark "60" in the data structure 646A to reconfigure the data structure 618A to accommodate the new list of ordered sequence numbers (21-60) in some embodiments. In some other embodiments, the data structure is populated with at least the ordered sequence numbers from the next available ordered sequence number "23" to the current high-watermark "60" (e.g., 23-60) as illustrated in FIG. 6F-1. The nextval pointer 648A for data structure 618A points to the next available ordered sequence number "23" in these examples according to the nextval data in data structure 646A, regardless of how the data structure 618A is populated.

Figure 6G:
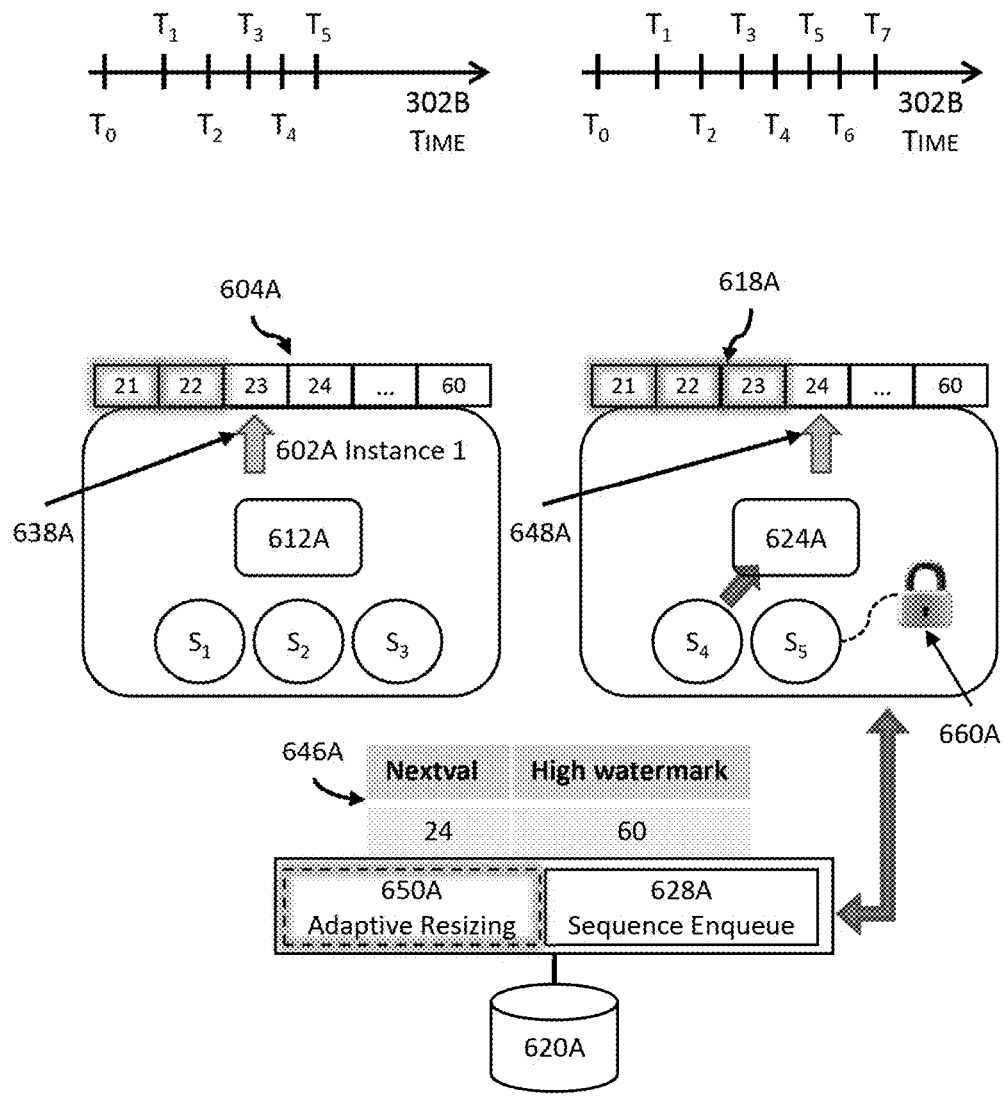

FIG. 6G continues the example in FIG. 6F or FIG. 6F-1 and further illustrates that the entity corresponding to instance two 616A acquires the lock 660A and starts consuming the next available ordered sequence number ("23" in this example), and the nextval pointer 648A is moved to the current next available ordered sequence number "24". The nextval data in the data structure 646A may also be updated to reflect the current next available ordered sequence number "24" so that ordered sequences may be enforced among the multiple computing entities that request for ordered sequence numbers in the database environment.

Therefore, what has been described is an improved approach to adaptively provision the number of sequence values in a database environment. The present embodiments provide a technique or techniques to address at least the aforementioned shortcomings of conventional approaches and also to improve over various conventional approaches.

System Architecture Overview

Figure 7:
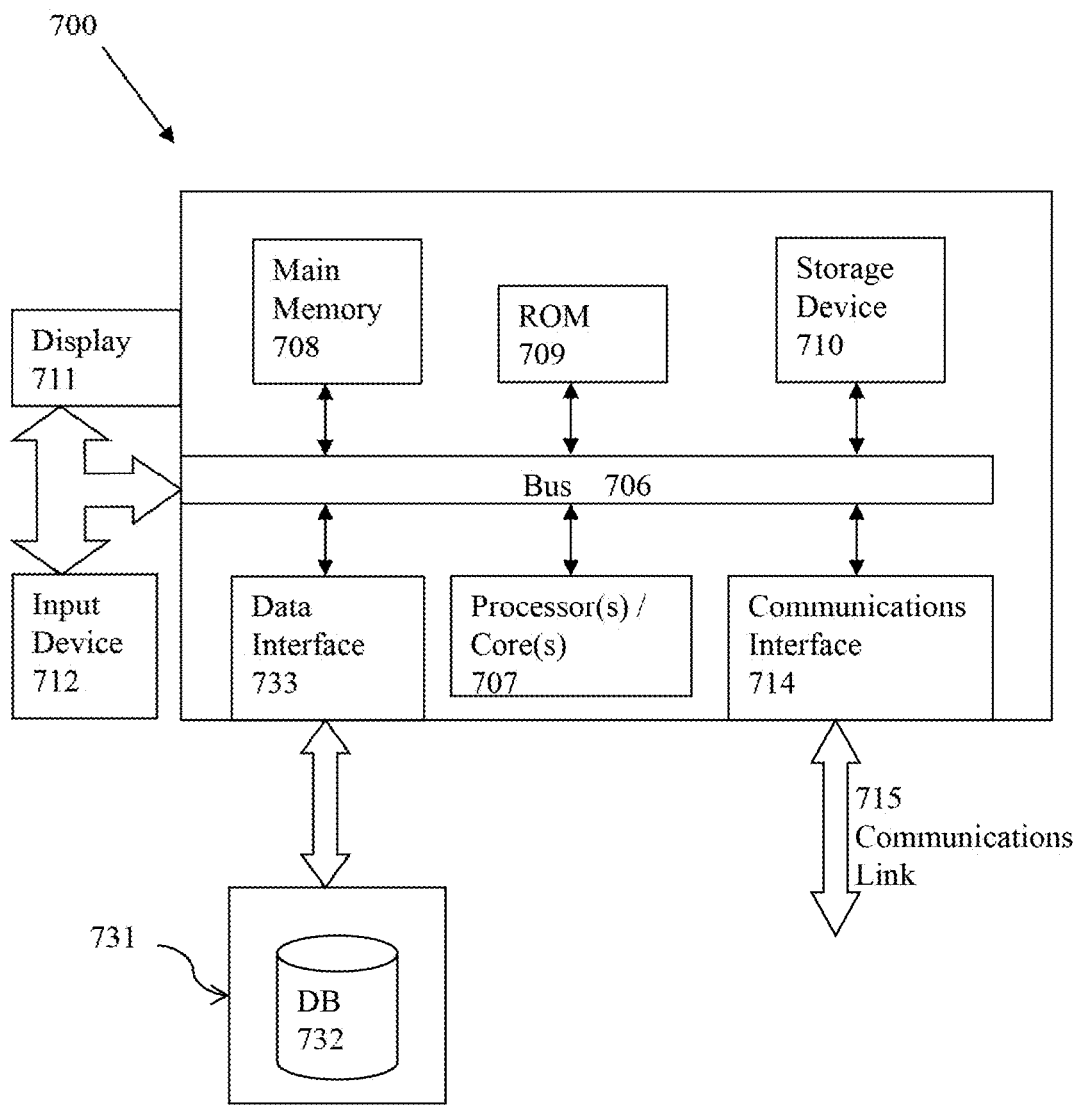
FIG. 7 illustrates a block diagram of an illustrative computing system suitable for implementing some embodiment of the present disclosure.

FIG. 7 is a block diagram of an illustrative computing system 700 suitable for implementing an embodiment of the present disclosure. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), data interface 733, and cursor control.

According to some embodiments of the disclosure, computer system 700 performs specific operations by processor 707 executing one or more sequences of one or more instructions included in system memory 708. Such instructions may be read into system memory 708 from another non-transitory computer readable/usable medium, such as static storage device 709 or disk drive 710. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term non-transitory "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 700. According to other embodiments of the disclosure, two or more computer systems 700 coupled by communication link 710 (e.g., LAN, PTSN, or wireless network) may perform the sequence of instructions required to practice the disclosure in coordination with one another.

Computer system 700 may transmit and receive messages, data, and instructions, including program, e.g., application code, through communication link 715 and communication interface 714. Received program code may be executed by processor 707 as it is received, and/or stored in disk drive 710, or other non-volatile storage for later execution. A database 732 in a storage medium 731 may be used to store data accessible by the system 700 via data interface 733.

Figure 8:
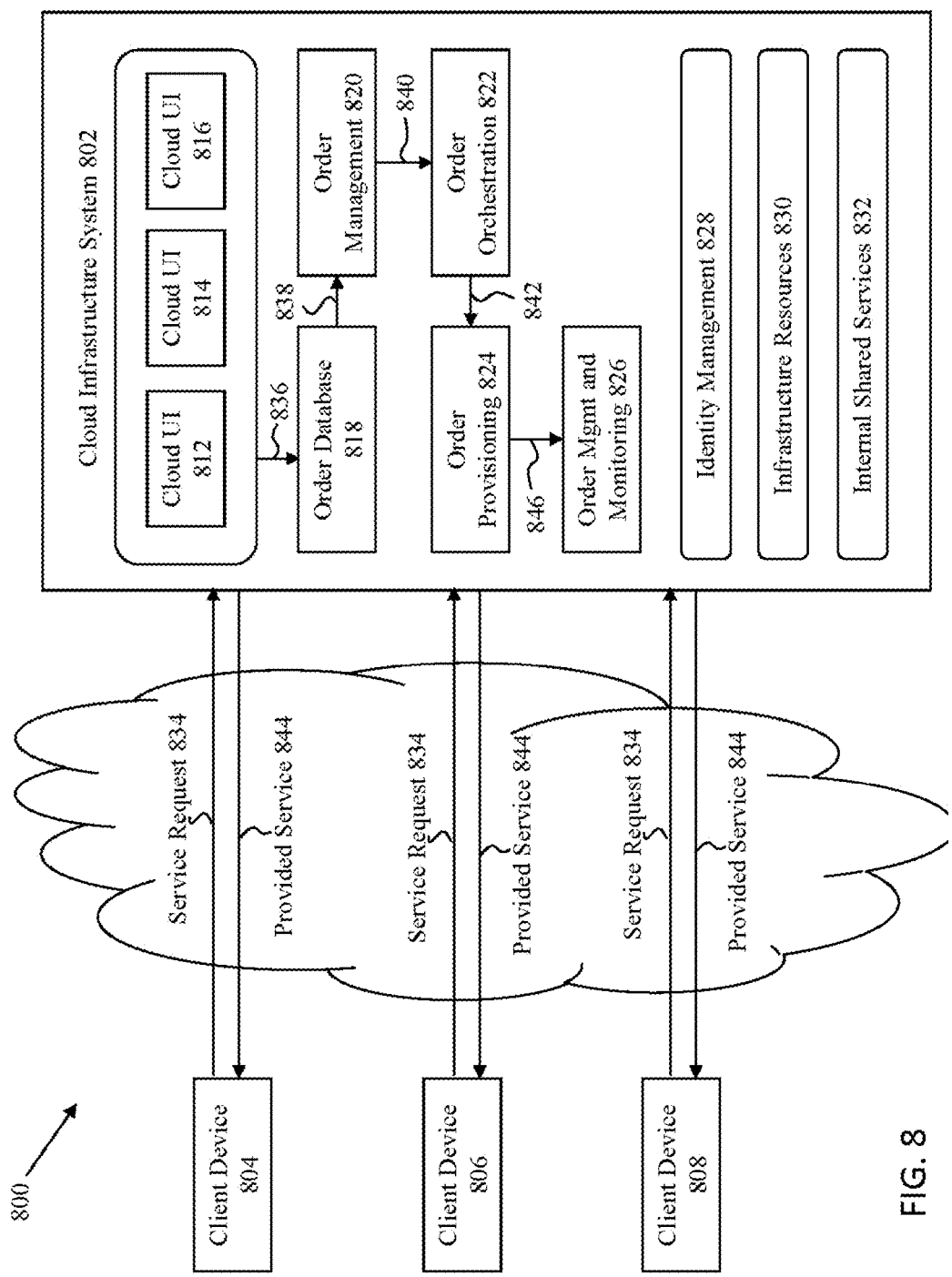
FIG. 8 illustrates a block diagram of one or more components of a system environment by which adaptive provisioning of sequence numbers in a clustered database environment is provided, in accordance with an embodiment of the present disclosure.

FIG. 8 illustrates a simplified block diagram of one or more components of a system environment 800 by which more efficient access to ordered sequences in a clustered database environment is provided, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 802 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
   identifying a cached list of sequence numbers;
   receiving a request for a set of sequence numbers in a database environment; and
   adaptively provisioning the set of sequence numbers to fulfill the request, wherein the set of sequence numbers is adaptively provisioned to dynamically identify a number of values to include in the set of sequence numbers.

2. The method of claim 1, wherein adaptively provisioning the one or more sequence numbers to fulfill the request is based at least in part upon an independent cache implementation comprising:
   determining whether the cached list of sequence numbers has been fully consumed; and
   when the cached list of sequence numbers is determined to have been fully consumed, adaptively determining a new list of sequence numbers based at least in part upon one or more criteria, wherein the one or more criteria comprise at least one of a consumption rate for sequence numbers, a consumption time period, a total number of sequence numbers in the cached list of sequence numbers, or a high-watermark associated with the sequence numbers in the database environment.

3. The method of claim 1, wherein adaptively provisioning the one or more sequence numbers to fulfill the request is based at least in part upon an independent cache implementation, wherein a first instance or node corresponds to a first cache of sequence numbers and a second instance or node corresponds to a second cache of sequence numbers, and the first cache of sequence numbers does not overlap with the second cache of sequence numbers.

4. The method of claim 1, wherein adaptively provisioning the one or more sequence numbers to fulfill the request based at least in part upon a shared cache implementation, wherein a first instance or node corresponds to a first cache of sequence numbers and a second instance or node corresponds to a second cache of sequence numbers, and the first cache of sequence numbers overlaps with the second cache of sequence numbers.

5. The method of claim 1, wherein adaptively provisioning the one or more sequence numbers to fulfill the request based at least in part upon a shared cache implementation comprises:
   identifying or receiving the request for one or more sequence numbers;
   updating, at a requesting entity of the request, the cached list of sequence numbers with adaptively generated sequence numbers; and
   updating, at the requesting entity of the request, a high-watermark and a next available sequence number based at least in part upon the adaptively generated sequence numbers.

6. The method of claim 5, wherein adaptively provisioning the one or more sequence numbers to fulfill the request based at least in part upon the shared cache implementation further comprises:
   receiving a separate request for one or more separate sequence numbers from a separate requesting entity; and
   updating, at the separate requesting entity, a separate cached list of sequence numbers into an updated separate cached list of sequence numbers based at least in part upon the high-watermark and the next available sequence number.

7. The method of claim 6, wherein adaptively provisioning the one or more sequence numbers to fulfill the request based at least in part upon the shared cache implementation further comprises:
   when the updated separate cached list of sequence numbers is determined to have been fully consumed, performing a set of acts that comprises:
      identifying a separate request for one or more separate sequence numbers;
      updating, for a separate requesting entity, the updated separate cached list of sequence numbers into a next cached list of sequence numbers with new adaptively generated sequence numbers; and
      consuming, at the separate requesting entity, the next cached list of sequence numbers.

8. A system comprising:
   a processor; and
   a memory to hold a set of program code instructions, in which the set of program code instructions comprises program code to perform a set of acts, the set of acts comprising:
   identifying a cached list of sequence numbers;
   receiving a request for a set of sequence numbers in a database environment; and
   adaptively provisioning the set of sequence numbers to fulfill the request requested by a computing entity of multiple computing entitles in the database environment, wherein
      the set of sequence numbers is adaptively provisioned to dynamically identify a number of values to include in the set of sequence numbers, and
      each computing entity of the multiple computing entities stores one or more sequence numbers in a respective cache implementation of multiple cache implementations that are updated when a sequence number in the respective cache is consumed.

9. The system of claim 8, wherein adaptively provisioning the one or more sequence numbers to fulfill the request is based at least in part upon an independent cache implementation, the set of acts further comprising:
   determining whether the cached list of sequence numbers has been fully consumed; and
   when the cached list of sequence numbers is determined to have been fully consumed, adaptively determining a new list of sequence numbers based at least in part upon one or more criteria, wherein the one or more criteria comprise at least one of a consumption rate for sequence numbers, a consumption time period, a total number of sequence numbers in the cached list of sequence numbers, or a high-watermark associated with the sequence numbers in the database environment.

10. The system of claim 8, wherein adaptively provisioning the one or more sequence numbers to fulfill the request is based at least in part upon an independent cache implementation, wherein a first instance or node corresponds to a first cache of sequence numbers and a second instance or node corresponds to a second cache of sequence numbers, and the first cache of sequence numbers does not overlap with the second cache of sequence numbers.

11. The system of claim 8, wherein adaptively provisioning the one or more sequence numbers to fulfill the request based at least in part upon a shared cache implementation, wherein a first instance or node corresponds to a first cache of sequence numbers and a second instance or node corresponds to a second cache of sequence numbers, and the first cache of sequence numbers overlaps with the second cache of sequence numbers.

12. The system of claim 8, wherein adaptively provisioning the one or more sequence numbers to fulfill the request is based at least in part upon a shared cache implementation, the set of acts further comprising:
identifying or receiving the request for one or more sequence numbers;
updating, at a requesting entity of the request, the cached list of sequence numbers with adaptively generated sequence numbers; and
updating, at the requesting entity of the request, a high-watermark and a next available sequence number based at least in part upon the adaptively generated sequence numbers.

13. The system of claim 12, the set of acts further comprising:
receiving a separate request for one or more separate sequence numbers from a separate requesting entity; and
updating, at the separate requesting entity, a separate cached list of sequence numbers into a separate updated cached list of sequence numbers based at least in part upon the high-watermark and the next available sequence number.

14. The system of claim 13, the set of acts further comprising:
when the updated separate cached list of sequence numbers is determined to have been fully consumed, performing a set of acts that comprises:
identifying a separate request for one or more separate sequence numbers;
updating, for a separate requesting entity, the updated separate cached list of sequence numbers into a next cached list of sequence numbers with new adaptively generated sequence numbers; and
consuming, at the separate requesting entity, the next cached list of sequence numbers.

15. A computer program product including a non-transitory computer readable medium having stored thereupon instructions which, when executed by a processor, causes the processor to perform a set of acts, the set of acts comprising:
identifying a cached list of sequence numbers;
receiving a request for a set of sequence numbers in a database environment; and
adaptively provisioning the set of sequence numbers to fulfill the request, wherein the set of sequence numbers is adaptively provisioned to dynamically identify a number of values to include in the set of sequence numbers.

16. The computer program product of claim 15, wherein adaptively provisioning the one or more sequence numbers to fulfill the request is based at least in part upon an independent cache implementation, the set of acts further comprising:
determining whether the cached list of sequence numbers has been fully consumed; and
when the cached list of sequence numbers is determined to have been fully consumed, adaptively determining a new list of sequence numbers based at least in part upon one or more criteria, wherein the one or more criteria comprise at least one of a consumption rate for sequence numbers, a consumption time period, a total number of sequence numbers in the cached list of sequence numbers, or a high-watermark associated with the sequence numbers in the database environment.

17. The computer program product of claim 15, wherein adaptively provisioning the one or more sequence numbers to fulfill the request is based at least in part upon an independent cache implementation, wherein a first instance or node corresponds to a first cache of sequence numbers and a second instance or node corresponds to a second cache of sequence numbers, and the first cache of sequence numbers does not overlap with the second cache of sequence numbers.

18. The computer program product of claim 15, wherein adaptively provisioning the one or more sequence numbers to fulfill the request based at least in part upon a shared cache implementation, wherein a first instance or node corresponds to a first cache of sequence numbers and a second instance or node corresponds to a second cache of sequence numbers, and the first cache of sequence numbers overlaps with the second cache of sequence numbers.

19. The computer program product of claim 15, wherein adaptively provisioning the one or more sequence numbers to fulfill the request based at least in part upon a shared cache implementation, the set of acts further comprising:
identifying or receiving the request for one or more sequence numbers;
updating, at a requesting entity of the request, the cached list of sequence numbers with adaptively generated sequence numbers; and
updating, at the requesting entity of the request, a high-watermark and a next available sequence number based at least in part upon the adaptively generated sequence numbers.

20. The computer program product of claim 19, the set of acts further comprising:
receiving a separate request for one or more separate sequence numbers from a separate requesting entity; and
updating, at the separate requesting entity, a separate cached list of sequence numbers into a separate updated cached list of sequence numbers based at least in part upon the high-watermark and the next available sequence number.

21. The computer program product of claim 20, the set of acts further comprising:
when the updated separate cached list of sequence numbers is determined to have been fully consumed, performing a set of acts that comprises:
identifying a separate request for one or more separate sequence numbers;

updating, for a separate requesting entity, the updated separate cached list of sequence numbers into a next cached list of sequence numbers with new adaptively generated sequence numbers; and consuming, at the separate requesting entity, the next cached list of sequence numbers.

\* \* \* \* \*